(12) United States Patent
Nishio

(10) Patent No.: US 6,292,202 B1
(45) Date of Patent: *Sep. 18, 2001

(54) IMAGE PROCESSING METHOD AND APPARATUS FOR HARDWARE PROCESSING IMAGE DATA RECEIVED FROM A DEVICE USING SOFTWARE PROCESSING

(75) Inventor: Masahiro Nishio, Higashiyamato (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,407

(22) Filed: Jan. 28, 1998

Related U.S. Application Data

(63) Continuation of application No. 08/281,616, filed on Jul. 28, 1994, now abandoned.

(30) Foreign Application Priority Data

Jul. 29, 1993 (JP) .................................................. 5-187933

(51) Int. Cl.[7] ...................................................... G06F 13/14
(52) U.S. Cl. ......................... 345/520; 345/501; 358/1.15; 358/448; 358/530
(58) Field of Search ................................. 345/501, 507, 345/509, 515, 516, 512; 358/500, 501, 523, 524, 530–540, 400, 401, 404, 467, 443, 453, 1.1, 1.6, 1.15, 1.16; 382/276, 284, 286, 293–299, 305, 306, 307; 395/101, 102, 109, 115–117

(56) References Cited

U.S. PATENT DOCUMENTS

| | | | |
|---|---|---|---|
| 5,086,497 | * 2/1992 | Horikawa et al. | 707/530 |
| 5,159,681 | * 10/1992 | Beck et al. | 395/116 |
| 5,315,404 | * 5/1994 | Kuboki et al. | 358/433 |
| 5,349,647 | * 9/1994 | Freiburg et al. | 358/1.16 |
| 5,436,732 | 7/1995 | Mikami | 358/444 |
| 5,436,981 | 7/1995 | Ishikawa | 382/173 |
| 5,587,800 | * 12/1996 | Miyazaki | 358/296 |
| 5,602,976 | * 2/1997 | Cooper et al. | 395/116 |
| 5,638,498 | * 6/1997 | Tyler et al. | 395/117 |
| 5,682,549 | * 10/1997 | Tanaka et al. | 710/8 |
| 5,754,750 | * 5/1998 | Butterfield et al. | 395/118 |
| 5,970,216 | * 10/1999 | Tanio et al. | 358/448 |

* cited by examiner

Primary Examiner—Ulka J. Chauhan
(74) Attorney, Agent, or Firm—Fitzpatrick, Cella, Harper & Scinto

(57) ABSTRACT

On the basis of control information of an image received from an external device via an external parallel interface, a frame memory control unit stores image data, which has been transferred from the external device, in a band memory B obtained by partitioning a frame memory into band memories A and B. The frame memory control unit subjects the image stored in the band memory B to image processing based upon the received control information, stores the processed results in the band memory A and then sends image data, which is obtained by image-processing the stored results, to a printer or to the external device. Accordingly, highly sophisticated image processing can be achieved with a minimal memory capacity.

7 Claims, 20 Drawing Sheets

FIG. 8

(BAND INFORMATION TABLE)

| | | | | | | | |
|---|---|---|---|---|---|---|---|
| BAND 1 | IIN | POINTER | IIN | POINTER | IIN | POINTER | ---------- |
| BAND 2 | IIN | POINTER | IIN | POINTER | IIN | POINTER | ---------- |
| BAND 3 | IIN | POINTER | IIN | POINTER | IIN | POINTER | ---------- |
| ⋮ | | | | | | | |
| BAND N | IIN | POINTER | IIN | POINTER | IIN | POINTER | ---------- |

(ATTRIBUTE INFORMATION TABLE)

| |
|---|
| IMAGE CATEGORY |
| IMAGE SIZE (W) |
| IMAGE SIZE (H) |
| ENLARGEMENT / REDUCTION RATIO |
| OUTPUT AREA ( OFFSET A ) |
| OUTPUT AREA ( OFFSET B ) |
| OUTPUT AREA ( OFFSET C ) |
| OUTPUT AREA ( WIDTH D ) |
| IMAGE PROCESSING TABLE POINTER |
| |

IIN : IMAGE IDENTIFICATION NUMBER (IMAGE PROCESSING TABLE)

| |
|---|
| IMAGE PROCESSING CODE |
| PARAMETER A |
| PARAMETER B |
| ⋮ |
| IMAGE PROCESSING CODE |
| PARAMETER A |
| PARAMETER B |
| PARAMETER C |
| ⋮ |

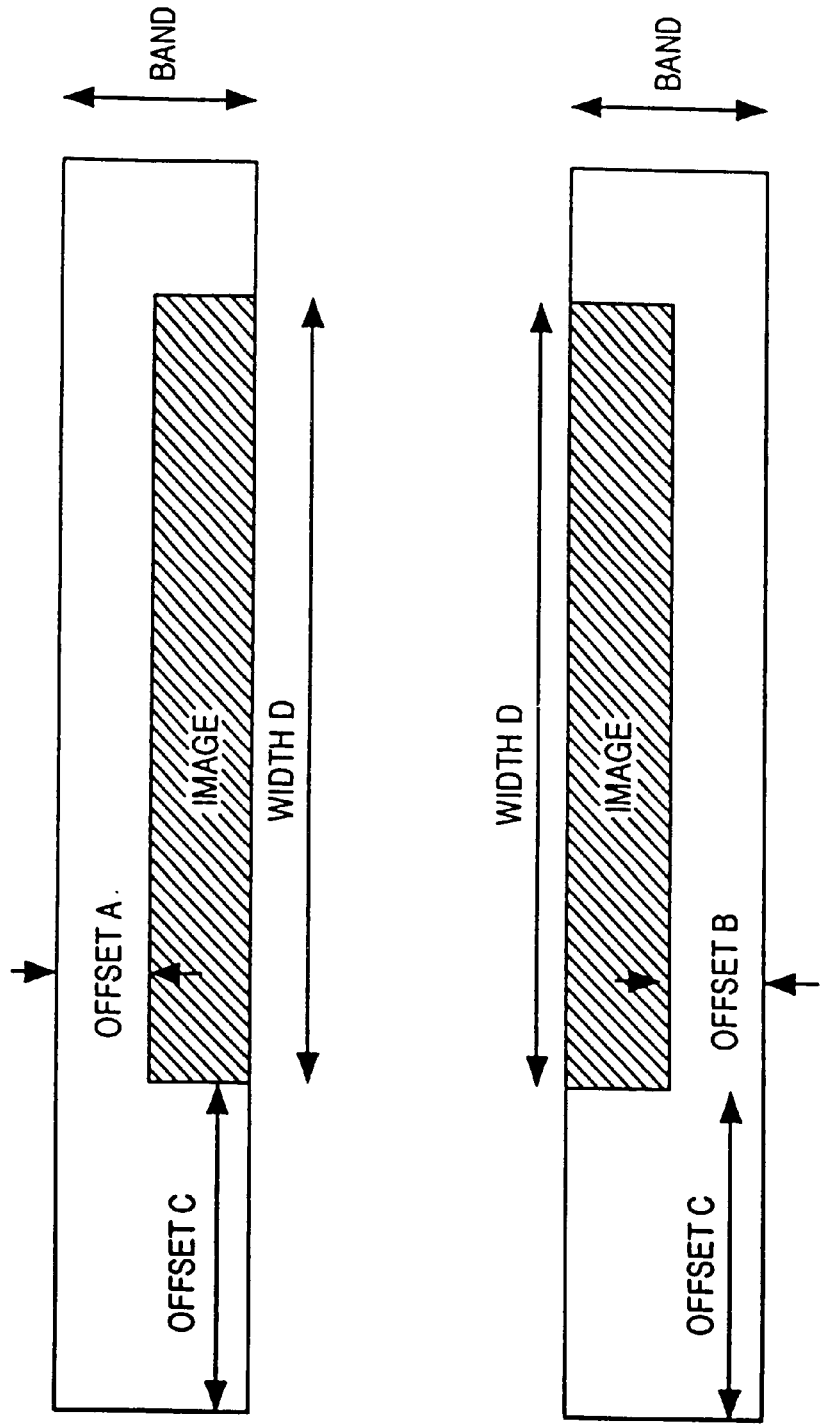

IMAGE PROCESSING METHOD AND APPARATUS FOR HARDWARE PROCESSING IMAGE DATA RECEIVED FROM A DEVICE USING SOFTWARE PROCESSING

This is a continuation of application Ser. No. 08/281,616, filed on Jul. 28, 1994, now abandoned.

BACKGROUND OF THE INVENTION

This invention relates to an image processing method and apparatus. More particularly, the invention relates to an image processing method and apparatus for applying image processing to image data transferred from an external device such as a computer.

FIG. 19 is a block diagram illustrating the construction of an image forming apparatus such as a printer for receiving image data possessed by an external device such as a computer and forming an image on a recording medium such as recording paper.

In a printer having a construction of the kind illustrated, image data sent from an external device is received by an interface controller 401 and stored in a frame memory 402 under the control of a memory controller 403. The image data that has been stored in the frame memory 402 is converted to print data by an image generator 404, after which the print data is stored in an output buffer 406. The print data is transferred from the output buffer 406 to a printing unit 407 in synchronism with the operation of the printing unit 407 by control exercised by a printer controller 405, and the printing unit 407 executes printing.

FIG. 20 is a diagram showing the printing operation performed by the printing unit 407. As shown in FIG. 20, the print data is partitioned into units conforming to the recording width (band width) of the recording (printing) head in the printing unit 407. A single image is formed by successively printing the data in these band-width units.

The conventional technique has the following shortcomings:

(1) Applying geometric conversion processing such as enlargement, reduction and rotation to the image transferred from the external device is possible on the side of the image forming apparatus. Processing such as outputting the layout of a plurality of images, pixel operations among a plurality of images and image processing based upon use of a spatial filter may be executed beforehand on the side of the external device, such as a host computer, whereupon it is necessary that the processed data be transferred to the image forming apparatus. However, in a case where an image having a large quantity of data, such as a color image, is processed, a large-capacity external storage device and a high processing speed are required. External devices capable of realizing such processing are limited.

(2) Formats available for the image data include multi-valued formats in RGB and CYMK, palette and bitmap formats, etc. In addition, a plurality of formats exist for each category of image. In the prior art described above, image data capable of being transferred between the external device and the image forming apparatus at the time of image formation is of one category only and has only a single format.

SUMMARY OF THE INVENTION

An object of the present invention is to provide an image processing method and apparatus through which not only pixel operations involving plural items of image data, image synthesizing and layout processing but also image-data format conversion are realized at a high performance image processing with a minimum necessary amount of memory capacity.

According to a preferred embodiment of the present invention, the foregoing object is attained by providing an image processing method for processing image data in prescribed units, comprising a first receiving step of receiving control information, which relates to at least one image, from an external device, a requesting step of requesting the external device for image data of the image in the prescribed units, a second receiving step of receiving this image data from the external device, a storing step of storing the image data, which has been received at the second receiving step, in a prescribed area of memory means, and a processing step of processing the image data, which has been stored in the prescribed area of the memory means, based upon the control information, and storing the processed results in another prescribed area of the memory means.

Further, the present invention provides an image processing apparatus for processing image data in prescribed units, comprising communication means for receiving control information, which relates to at least one image, from an external device, subsequently requesting the external device for image data of the image in the prescribed units, and receiving this image data from the external device, memory means for storing the image data, which has been received by the communication means, in a prescribed area, and processing means for processing the image data, which has been stored in the prescribed area of the memory means, based upon the control information, and storing the processed results in another prescribed area of the memory means.

Another object of the present invention is to provide an image processing method and apparatus which realize high performance image processing with a simple structure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing an example of band information table, etc;

FIG. 9 is a diagram showing an example of area information;

DESCRIPTION OF THE PREFERRED EMBODIMENTS

An image processing apparatus according to embodiments of the present invention will now be described in detail with reference to the drawings.

<<First Embodiment>>

<Function Blocks>

Figure 1:
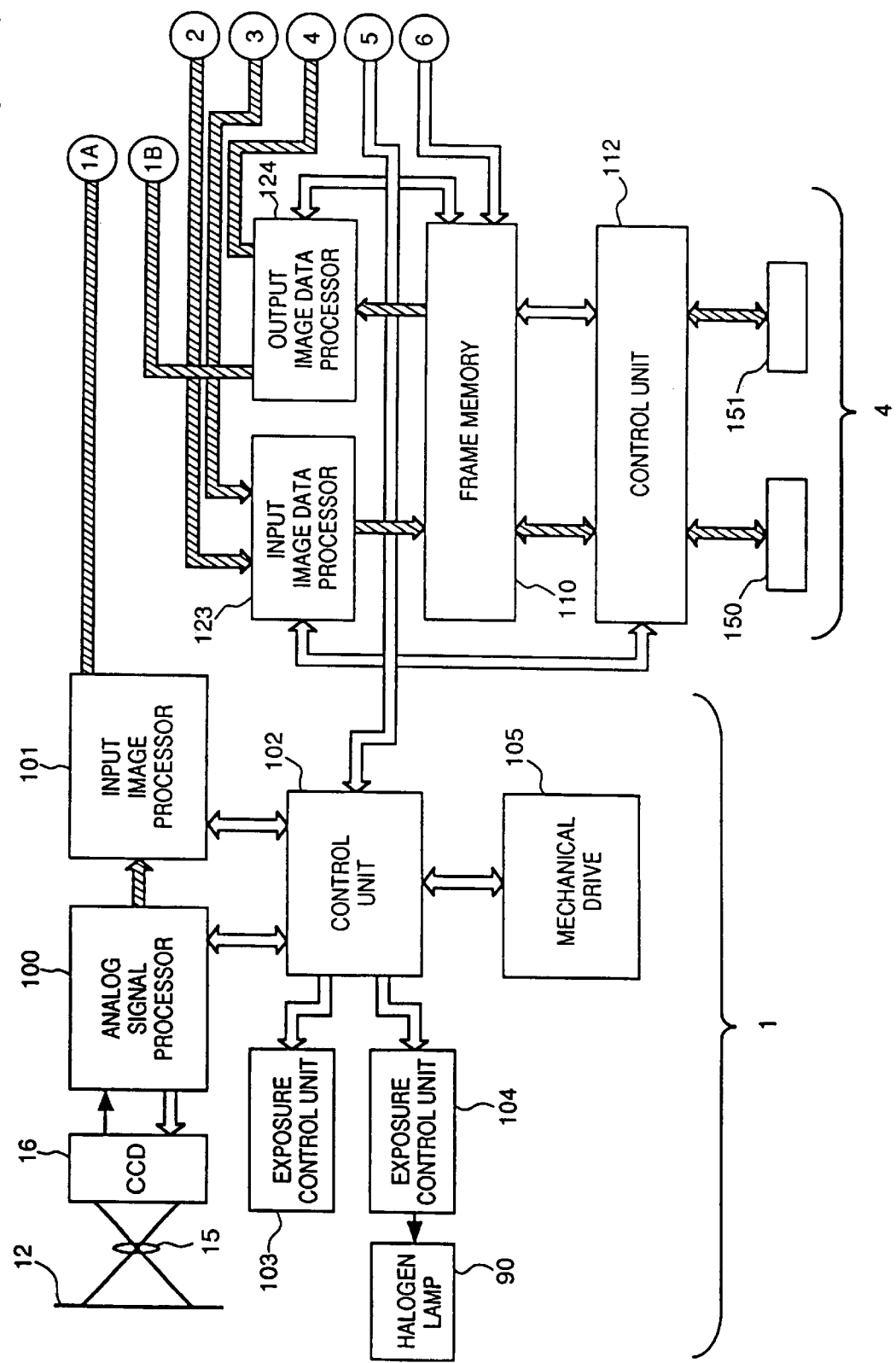
FIGS. 1 and 2 are block diagrams illustrating the construction of an image processing apparatus according to an embodiment of the present invention.
Figure 2:
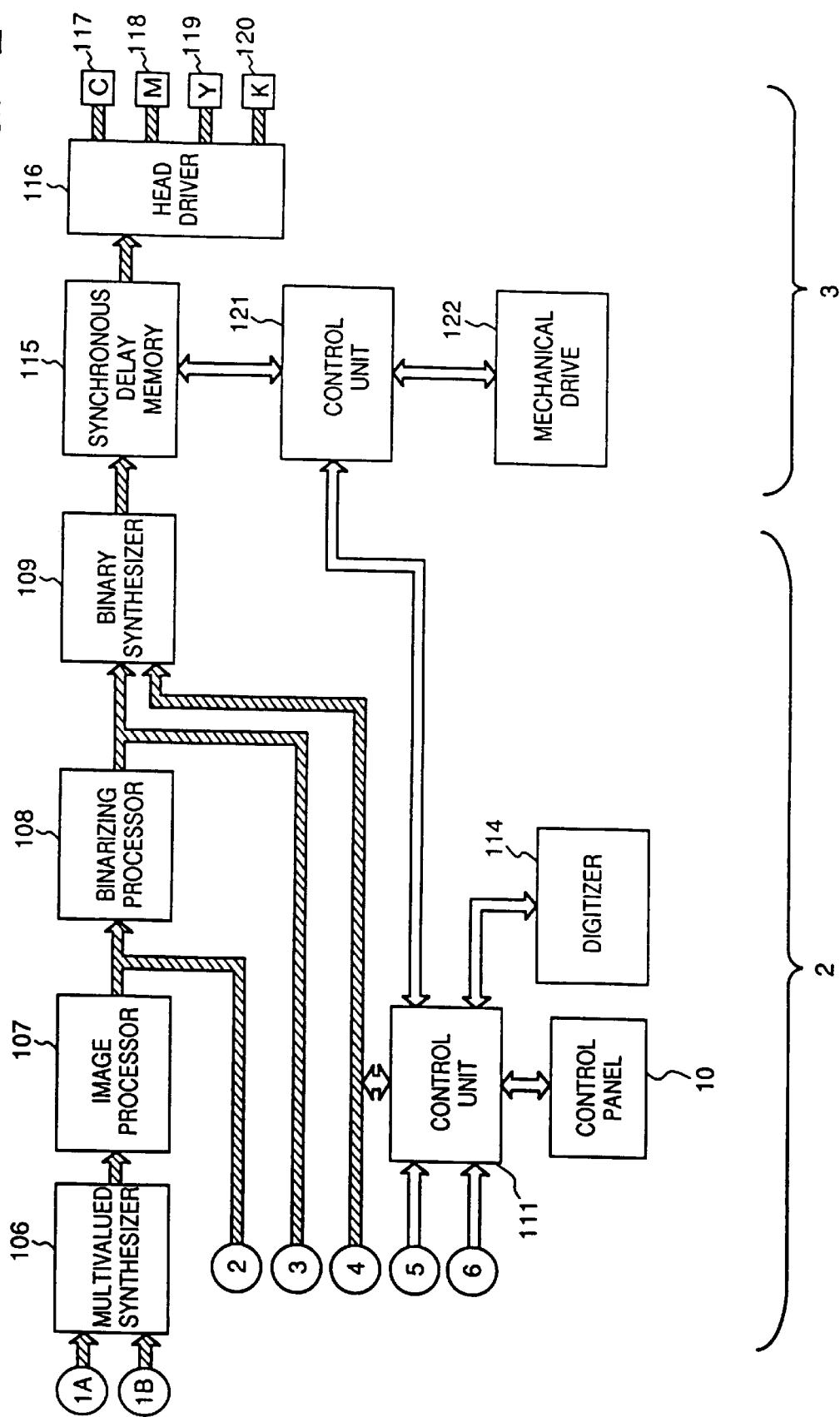

FIGS. 1 and 2 are functional block diagrams illustrating the construction of an image processing apparatus according to an embodiment of the present invention.

Control units 102, 111, 121 and 112 are control circuits for controlling a scanner 1, a controller 2, a printer 3 and a frame memory control unit 4, respectively. These control units are each constituted by a microcomputer, a program ROM, a data memory and a communication circuit, etc. The control units are interconnected by communication lines. In a case where this embodiment operates as a color copier, a so-called master/slave control mode is adopted, in which commands from the control unit 111 serve as the basis for operations performed by the other control units. In the case of a remote mode, in which various operations are carried out by commands from a host (not shown) via external parallel interfaces 150, 151, the control unit 112 serves as the master and sends commands to the control unit 111, on the basis of which the control unit 111 sends command to the control units 102, 121. The transition to the remote mode is performed in response to a command from the host or operation of a key switch on a control panel 10.

In the case in which the apparatus operates as a color copier, the control unit 111 operates in accordance with an input command from the control panel 10 or a digitizer 114. The control panel 10 uses a liquid-crystal cell, for example, as a display unit, and the surface of the display is equipped with a touch panel comprising transparent electrodes. The user touches the touch panel to select operating commands, such as a command relating to color, a command relating to an editing operation, etc. Frequently used keys such as keys concerning various operations are provided on the control panel 10 independently. Examples of such keys are a start key for commanding the start of a copying operation, a stop key for commanding the end of a copying operation, a reset key for resetting the operating mode to the standard state, and a projector key for selecting a projector. The digitizer 114 is for entering position information needed for trimming, masking, etc. This is connected as an option in a situation where complicated editing processing is required. The control unit 111 controls a multivalued synthesizer 106, an image processor 107, a binarizing processor 108 and a binary synthesizer 109.

The control unit 102 controls a mechanical drive 105, which controls the drive of mechanical parts in the scanner 1, an exposure control unit 103, which controls the exposure of a lamp when an original is read, and an exposure control unit 104 for controlling the exposure of a halogen lamp 90 when a projector is used. The control unit 102 controls an analog signal processor 100, which executes various types of processing relating to images, and an input image processor 101.

The control unit 121 controls a mechanical drive 122, which controls the drive of mechanical parts in the printer 3, and a synchronous delay memory 115 for absorbing discrepancies in the mechanical operating time of the printer 3 and applying a delay correction corresponding to the array of recording heads 117~120 in the mechanism.

Image processing according to the embodiment having the construction of FIGS. 1 and 2 will now be described in line with the flow of image data.

The image of an original 12 formed on a CCD 16 by a lens 15 is converted into an analog signal by the CCD 16. The converted image information enters the analog signal processor 100 serially in the order red (R), green (G) and blue (B), by way of example. The analog signal processor 100 performs a sample-and-hold operation, a dark-level correction and control of dynamic range for each of the colors red, green and blue, then effects an analog-to-digital conversion (A/D conversion) to convert the data to a serial multivalued (e.g., eight bits per color) digital image signal and outputs the digital signal to the input image processor 101. The latter subjects the serial multivalued digital image signal from the analog signal processor 100 to corrective processing, such as a CCD correction and gamma correction, necessary in the image reading circuitry.

The multivalued synthesizer 106 of controller 2 either selects the serial multivalued digital image signal sent from the scanner 1 or a serial multivalued digital signal sent from a frame memory 110 or combines these two image signals. The image data selected or combined is sent to the image processor 107 intact as a serial multivalued digital image signal.

The image processor 107 executes smoothing processing, edge emphasis, black extraction and masking processing for color-correction of the recording inks used by the recording heads 117~120. The processed image data enters the binarizing processor 108 and the frame memory 110 intact as a serial multivalued digital image signal.

The binarizing processor 108 is a circuit for binarizing the serial multivalued digital image signal. The processor 108 is capable of selecting simple binarizing processing based upon a fixed slice level or pseudo-halftone processing based upon the error-diffusion method. Here the serial multivalued digital image signal is converted into a four-color, binary parallel image signal. Four-color image data is sent to the binary synthesizer 109, and three-color image data is sent to the frame memory 110.

The binary synthesizer 109 either selects a three- or four-color, binary parallel image signal sent from the frame memory 110 or the four-color, binary parallel image signal sent from the binarizing processor 108 or combines these image signals to produce a four-color, binary parallel image signal.

The control unit 112 of the frame memory control unit 4 controls the frame memory 110 and outputs the image data, which has been stored in the frame memory 110, so as to occupy a prescribed composite position by making timing conform to the operations of the multivalued synthesizer 106 and binary synthesizer 109. In addition, the control unit 112 writes the image data sent from the scanner 1 to the frame memory 110 intact as multiple values from the image processor 107 or as a binary value from the binarizing processor 108. The control unit 112 also performs control of a general-purpose parallel interface such as an IEEE-488 (so-called GPIB) interface or SCSI interface. Input/output of image data with respect to the host and mode control by the host are performed via this interface.

An input image data processor 123, the details of which will be described later, performs enlargement processing, a logarithmic conversion and a palette conversion, etc., in response to commands from the control unit 112.

The synchronous delay memory 115 of the printer 3 absorbs discrepancies in the mechanical operating time of the printer 3 and generates the timing necessary for driving the recording heads 117~120.

A head driver 116 is an analog drive circuit for driving the recording heads 117~120. This circuit generates internally the signals that are capable of driving the recording heads.

The recording heads 117~120 form an image on recording paper by jetting inks of the colors cyan, magenta, yellow and black.

<Frame Memory Control Unit>

The frame memory control unit 4 will now be described in further detail.

Figure 3:
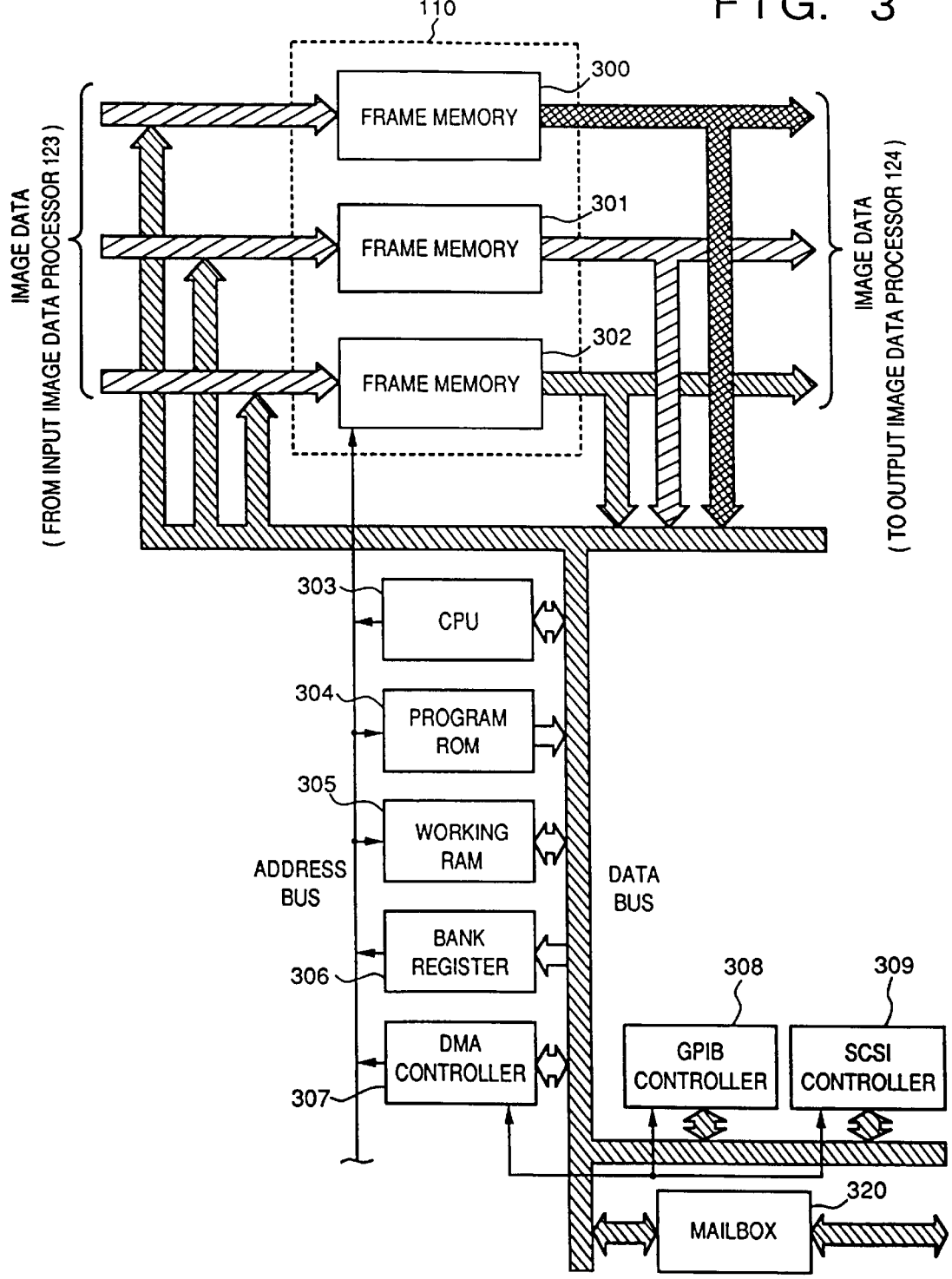
FIG. 3 is a block diagram illustrating the detailed construction of a frame memory and control unit shown in FIGS. 1 and 2.

FIG. 3 is a block diagram illustrating the detailed construction of a frame memory 110 and control unit 112.

A CPU 303 in FIG. 3, which is used as a well-known microprocessor in this embodiment, executes control in accordance with programs stored in a program ROM 304, etc., and uses a RAM 305 as a work area.

A GPIB controller 308 and an SCSI controller 309 are for sending and receiving data to and from an external device, not shown. Both of these controllers perform a direction transfer of data with frame memories 300~302 via a DMA controller 307. It goes without saying that this interface with the external device is not limited to a GPIB or SCSI; any interface can be employed.

A mailbox 320 has a well-known dual-port RAM construction in order to carry out communication with the control unit 111. The control unit 112 performs an exchange of various information by utilizing the mailbox 320.

The frame memories 300~302 in this embodiment each have a storage capacity of 16 megabytes, for a total of 49 megabytes. In order to cover such a frame memory area, a 32-bit address is required. However, since the CPU 303 and DMA controller 307 used in this embodiment have only 16 bits for the address bus, a bank register 306 is used to make up for the bit deficiency. An address value and other control information can be set in the bank register 306 by the CPU 303.

<Overview of Apparatus>

Figure 4:
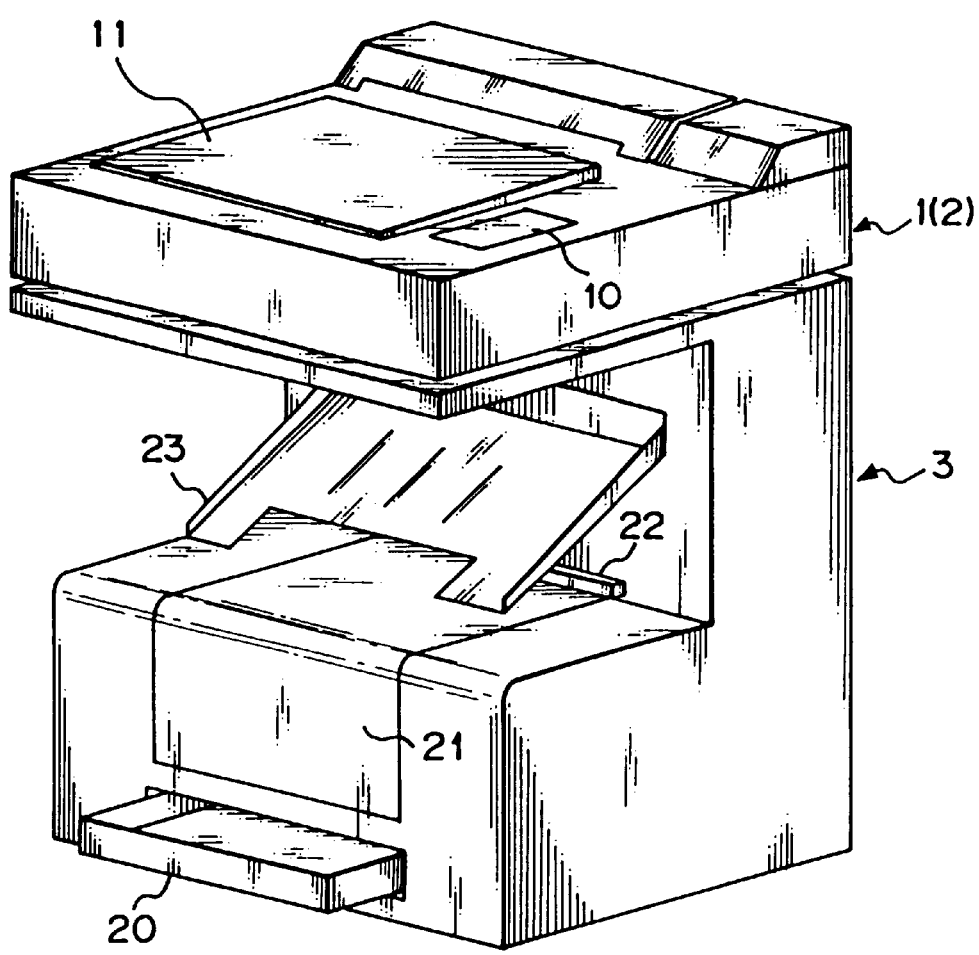
FIG. 4 is an external view of a digital color copier to which the invention is applied.

FIG. 4 is an external view of a digital color copier to which this embodiment is applied. The overall apparatus is divided into two portion.

Shown in the upper portion of FIG. 4 are a color image scanner (the above-mentioned scanner) 1 for reading an original image and outputting digital color image data, and the controller 2 for applying various types of image processing to the digital color image data and having various processing functions such as a function for interfacing the external device. It should be noted that the controller 2 is incorporated within the scanner 1. The scanner 1 also has an internal mechanism for reading a three-dimensional object or a sheet original placed face-down under a platen cover 11.

The control panel 10 disposed on the controller 2 allows the user to enter various information related to a copying operation.

The controller 2 issues commands related to the operation of the scanner 1 and printer 3 in accordance with the entered information. In the case of processing for executing complicated editing processing, the digitizer or the like is mounted instead of the platen cover 11 and this is connected to the controller 2 to make highly sophisticated processing possible.

The lower portion is FIG. 4 shows the printer 3 for recording on recording paper the color digital image signal outputted by the controller 2. The printer 3 in this embodiment is a full-color ink-jet printer using recording heads of the ink-jetting type.

The two portions of the apparatus described above, namely the scanner 1 and the printer 3, are capable of being separated and can be placed at locations remote from each other by lengthening the cables interconnecting them.

<Control>

Control of data transfer between the printer 3 and external device in this embodiment is realized by the above-described frame memory controller 4. The related control program is stored in the program ROM 304. The details of such control are described below.

As mentioned above, the apparatus of this embodiment is equipped with a GPIB interface and SCSI interface for interfacing the external device. The particular interface is selected in accordance with the external device used. This selection is made by using a switch (not shown) provided in the frame memory control unit 4. That is, the CPU 303 senses the status of this switch and decides which interface to use. The data transfer with the external device is executed via the interface thus selected. The details will now be described.

First, the external device notifies the frame memory control unit 4 of control information before the data transfer is made. The control information is broadly divided into layout information and image processing information. Each type of information will be described in detail below.

<Layout Information>

Layout information consists of an image identification number, image classification, format information, image size and output area, etc.

The image identification number is any arbitrary number of from 1 to 128. A single unique number is set for each image. According to this embodiment, image data managed by the external device and control information of which the frame memory control unit 4 is informed by the external device are uniquely correlated by the image identification number.

According to this embodiment, it is possible to deal with three image categories, namely a 24-bit RGB image, an eight-bit palette image and a binary bitmap image. The external device designates these image categories by the image classification.

In the case of the 24-bit RGB image, it is possible for the image to take on each of field-sequential, line-sequential and dot-sequential formats. The external device designates these formats by the format information.

Image size indicates the width W and height H of the original image transferred by the external device. Image size is designated in the form of pixel units, by way of example.

Figure 5:
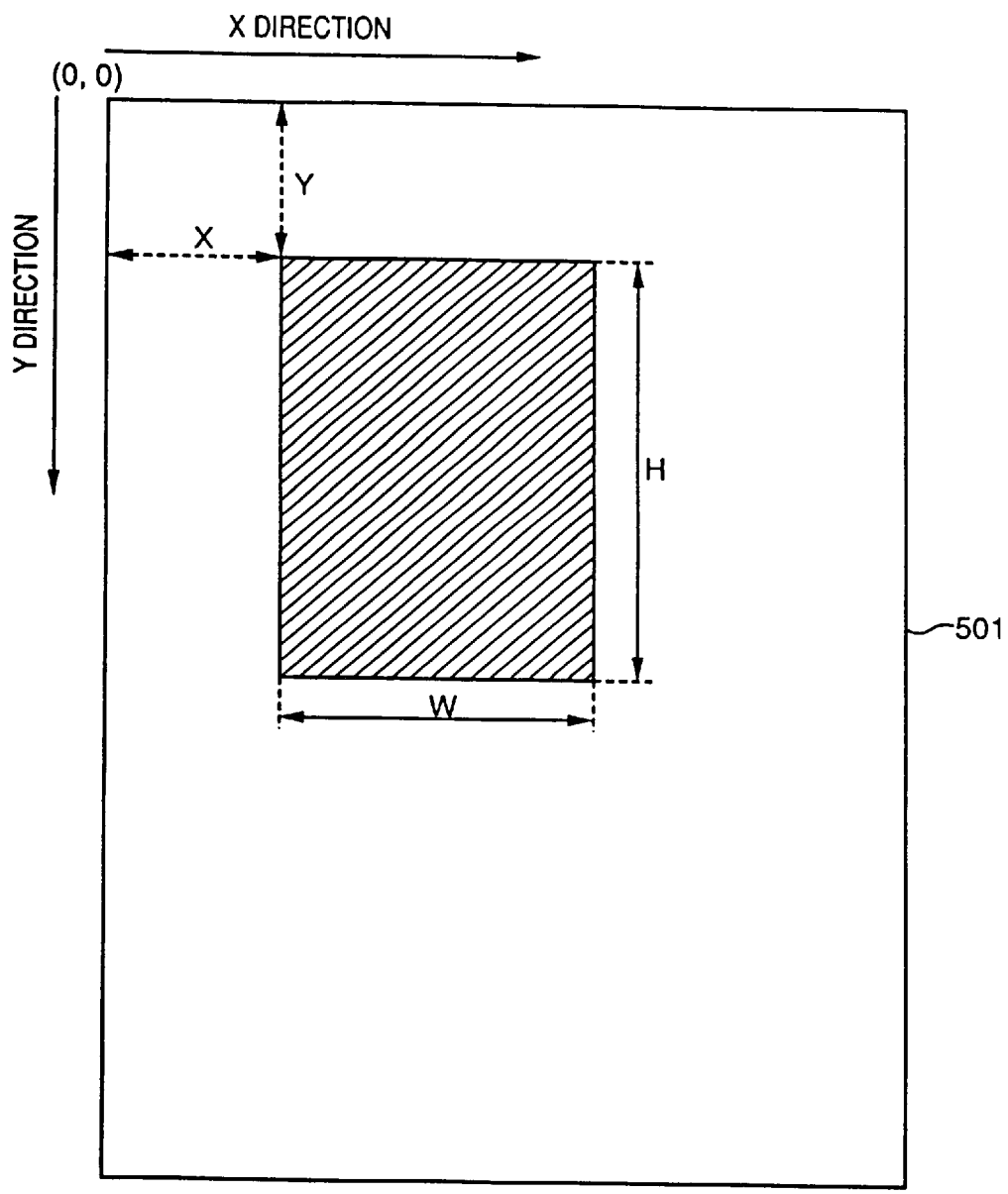
FIG. 5 is a diagram showing an example of an output area.

The output area is designated as shown in the example of FIG. 5. Specifically, when an image is laid out on recording paper 501, the upper left corner of the recording paper 501 is used as the origin, and coordinates (X, Y) of the upper left corner of the image area and the image size (W, H) are designated. Though millimeters, inches and pixels can be designated as the coordinate units, a conversion is made to pixel units by the software of the frame memory control unit 4 regardless of the type of designation made. Though it is described above that the upper left corner of the image area is designated by coordinates (X, Y) with the upper left corner of the recording paper 501 serving as the origin, this does not impose a limitation upon the invention. It goes without saying that any method of designation may be used, such as by designating the lower left corner of the image area using the lower right corner of the recording paper as the origin.

<Image Processing Information>

Image processing information is composed of the following items for each type of processing:

1. Rotation processing

This is an image processing function in which image data transferred from the external drive is outputted on recording paper upon being rotated in units of 90°. The frame memory control unit 4 is notified of the image identification number and angle of rotation of the image to undergo rotation processing.

2. Mirror-image processing

This is an image processing function in which image data transferred from the external device is outputted in the form of a mirror image on recording paper. The frame memory control unit 4 is notified of the image identification number of the image to undergo mirror-image processing.

3. Space-filter processing

Figure 6:
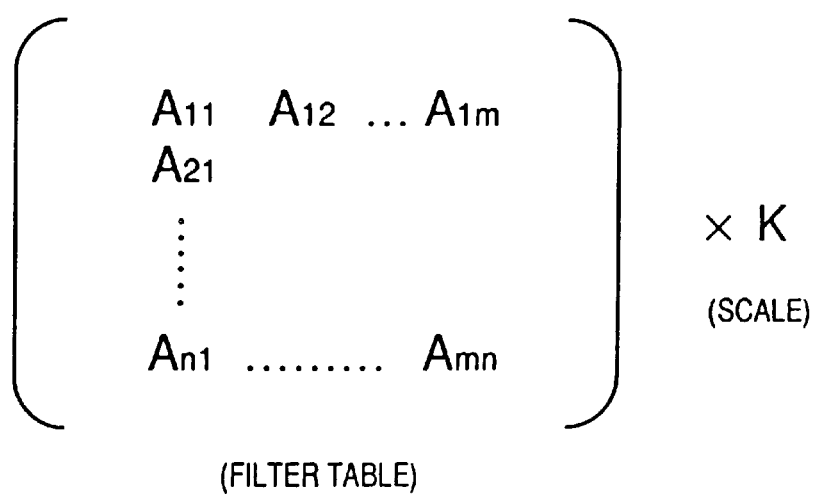
FIG. 6 is a diagram showing an example of a spatial filter table for an M×N area.

This is an image processing function for calculating the product sum of image data transferred from the external device and a spatial filter table of an M×N area. The frame memory control unit 4 is notified of the image identification number of the image to undergo space-filter processing, the spatial filter table of the M×N area, an example of which is shown in FIG. 6, factors, the position (Fx, Fy) of a pixel of interest and the image area (Fw, Fh) in which space-filter processing is executed.

4. Operations between pixels

Here inter-pixel operations mentioned below are applied to two images A, B transferred from the external device. Specifically, the external device designates this processing, designates the two images and designates parameters specific to each operation. The image A signifies an image whose layout is designated by layout information, and the image B signifies an image B possessed by the external device performing the operation on the image A. It is possible to select and designate a plurality of inter-pixel operations applied to the image A.

(a) Addition

The processing indicted by the following equation is executed between the two images; notification is given of the image identification numbers of the images A, B, scale and offset value:

$$\frac{\text{image } A + \text{image } B}{\text{scale}} + \text{offset}$$

(b) Subtraction

The processing indicated by the following equation is executed between the two images; notification is given of the image identification numbers of the images A, B, scale and offset value:

$$\frac{\text{image } A - \text{image } B}{\text{scale}} + \text{offset}$$

(c) Absolute value of difference

The processing indicated by the following equation is executed between the two images; notification is given of the image identification numbers of the images A, B:

$$|\text{image } A - \text{image } B|$$

(d) Multiplication

The processing indicated by the following equation is executed between the two images; notification is given of the image identification number of the images A, B, scale and offset value:

$$\frac{\text{image } A \times \text{image } B}{\text{scale}} + \text{offset}$$

(e) Synthesis 1

The processing indication by the following equation is executed between the two images; notification is given of the image identification numbers of the images A, B and a coefficient α%:

$$\frac{\text{image } A \times \alpha + \text{image } B \times (100 - \alpha)}{100}$$

(f) Synthesis 2

The processing indicated by the following equation is executed between the two images; notification is given of the image identification numbers of the images A, B and a masking value β:

$$\frac{\text{image } A \times \beta + \text{image } B \times (255 - \beta)}{255}$$

(g) Comparison 1

The comparison processing indicated by the following equation is executed between the two images to obtain pixels having large values in the corresponding two images; notification is given of the image identification numbers of the images A, B:

$$\text{Max}(\text{imageA}, \text{imageB})$$

(h) Comparison 2

The comparison processing indicated by the following equation is executed between the two images to obtain pixels having small values in the corresponding two images; notification is given of the image identification numbers of the images A, B:

$$\text{Min}(\text{image A}, \text{image B})$$

(i) Logical operation 1

The logical processing indicated by the following equation is executed between the two images to obtain the logical product of each pixel; notification is given of the image identification numbers of the images A, B:

$$\text{image A AND image B}$$

(j) Logical operation 2

The logical processing indicated by the following equation is executed between the two images to obtain the logical sum of each pixel; notification is given of the image identification numbers of the images A, B:

$$\text{image A OR image B}$$

(k) Logical operation 3

The logical processing indicated by the following equation is executed between the two images to obtain the exclusive-OR of each pixel; notification is given of the image identification numbers of the images A, B:

$$\text{image A XOR image B}$$

Figure 7:
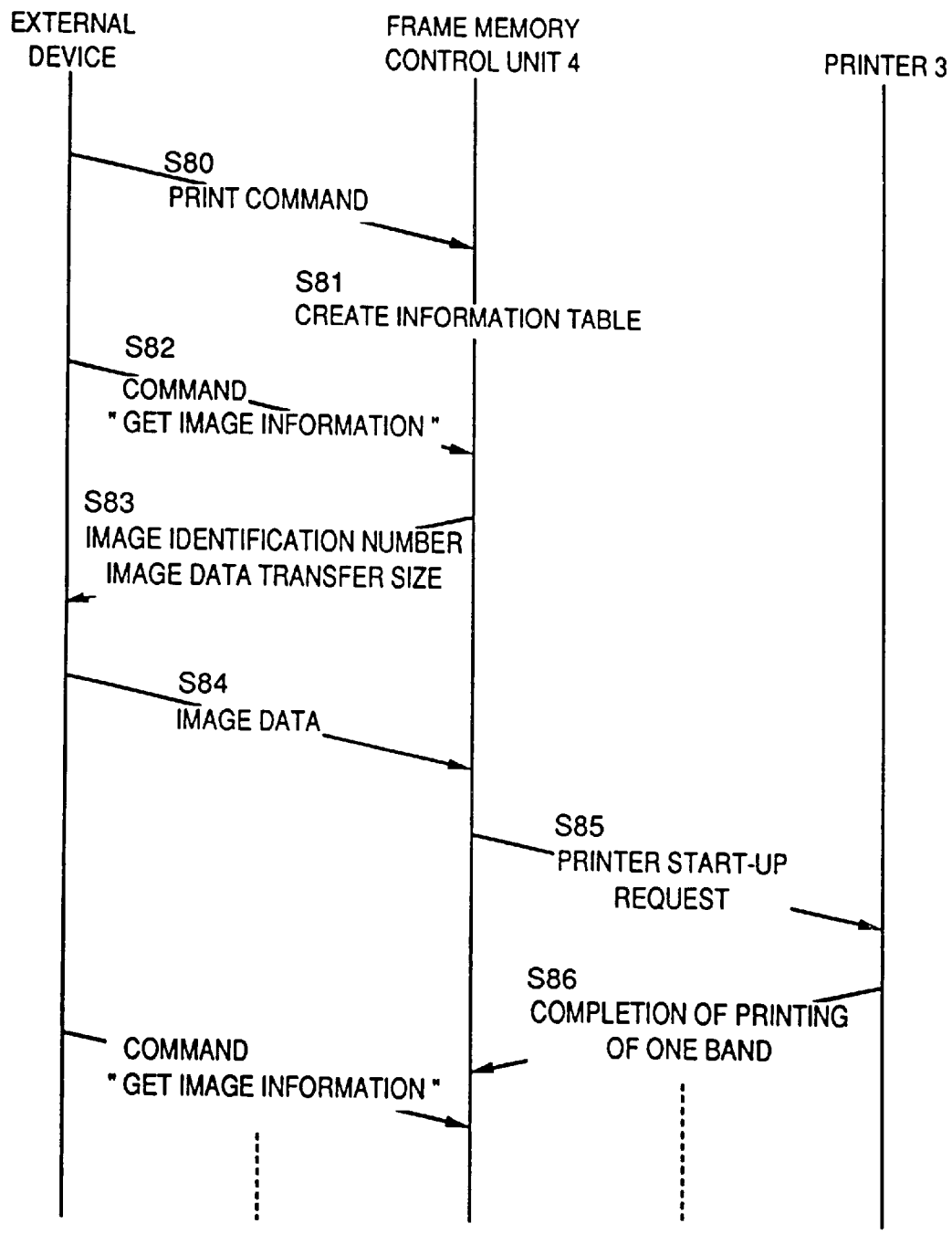
FIG. 7 is a diagram showing an overview of an image output process following issuance of a print command.

FIG. 7 is a diagram showing an overview of an image output process following issuance of a print command.

At the moment notification of the above-described control information completed, the external device sends a print command to the frame memory control unit 4 (step 80).

On the basis of the layout information and image processing information, the frame memory control unit 4 creates a band information table (step S81), an example of which is shown in FIG. 8, using the print command as a trigger.

The band information table is created for each and every band. Image identification number and pointers indicating attribute information tables corresponding to these numbers are set in the band information table. In a case where a plurality of images are outputted in one band, the relevant information is set from the beginning of the band information table in the order in which the external device transfers the image data.

Image category, image size (W, H), enlargement/reduction ratio (1~2000%), the output area of the band and a pointer indicating an image processing table are set in the attribute information table. It should be noted that the output area of a band is area information in each band created based upon area information communicated from the external device. As shown in the example of FIG. 9, offsets A, B and C indicate offset values from the upper edge, lower edge and side edge of a band, respectively, and D width indicates output width.

The image processing table is created based upon the image processing information. An image processing code and parameters, which are determined for each image processing operation, are set in the image processing table. In a case where a plurality of image processing operations have been designated with regard to data of one image, the above-mentioned information is set in the table in linked form, as illustrated in FIG. 8. In a case where there is no designation of image processing, "0", for example, is set in the pointer field of the attribute information table.

After the issuance of the print command, the external device sends a command GET IMAGE INFORMATION to the frame memory control unit 4 (step S82). Upon receiving this command, the frame memory control unit 4 executes various settings for transfer of image data and informs the external device of the image identification number and data transmission size (e.g., in byte units) of the image data to be transferred (step S83). Upon being notified, the external device is triggered into starting image transfer (step S84).

The frame memory control unit 4 divides the frame memories 300~302 logically into two portions for each and every color frame to manage them as band memories of two bands and stores image data in either of the band memories in dependence upon the type of image processing. Upon receiving image data of the designated transfer size, the frame memory control unit 4 subjects this image data to image processing and then issues a start-up request to the printer 3 and outputs the processed image data to the printer 3 (step S85).

Upon receiving notification of the completion of printing of one band from the printer 3 at step S86, the frame memory control unit 4 assumes a state in which the command GET IMAGE INFORMATION can be received from the external device. By subsequently repeating the steps from S82 to S86, an output image of the desired size can be obtained.

The details of image transfer and band-memory control in the frame memory control unit 4 will now be described with regard to each type of image processing. The details of control will be described successively starting from the leading band on the assumption that the external device has communicated the layout information and image processing information shown in FIG. 10 by way of example. Further, it is assumed that the following settings have been made in each area of areas (A) through (D):

(A) layout output of a single image;
(B) spatial filtering processing;
(C) pixel processing/image composition processing between two images; and
(D) designation of output of a plurality of images in the same band.

Figure 10:
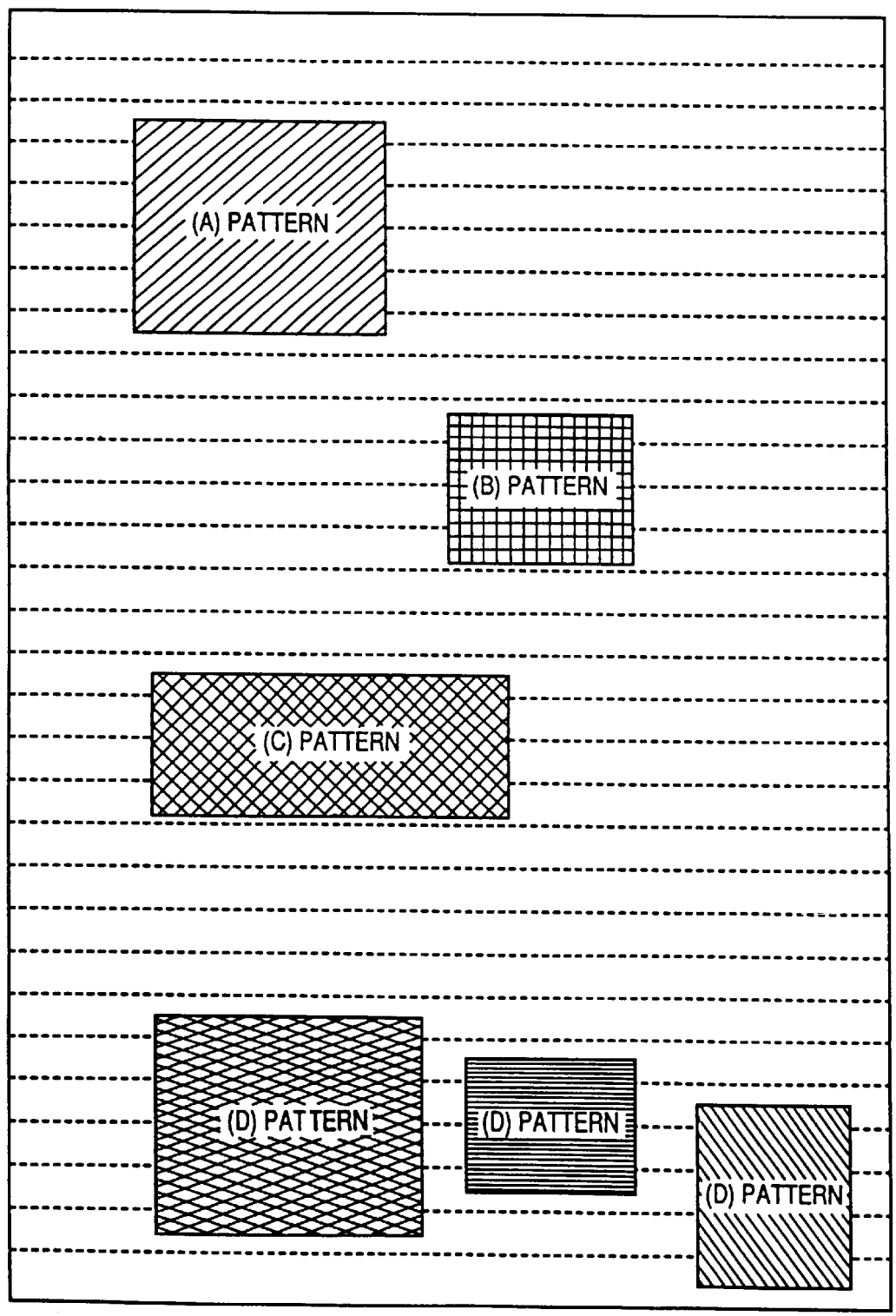
FIG. 10 is a diagram showing an example of images formed according to this embodiment.

First, as shown in FIG. 10, in a case where an image does not exist up to the output area the leading image (A) (hereinafter referred to as an "A pattern"), the frame memory control unit 4 so informs the printer 3 so that the recording paper will be fed by an amount equivalent to the width of this band. Meanwhile, in response to the command GET IMAGE INFORMATION from the external device, the frame memory control unit 4 gives notification of "0" for both the image identification number and data transfer size and does not execute transfer of image data.

Figure 11:
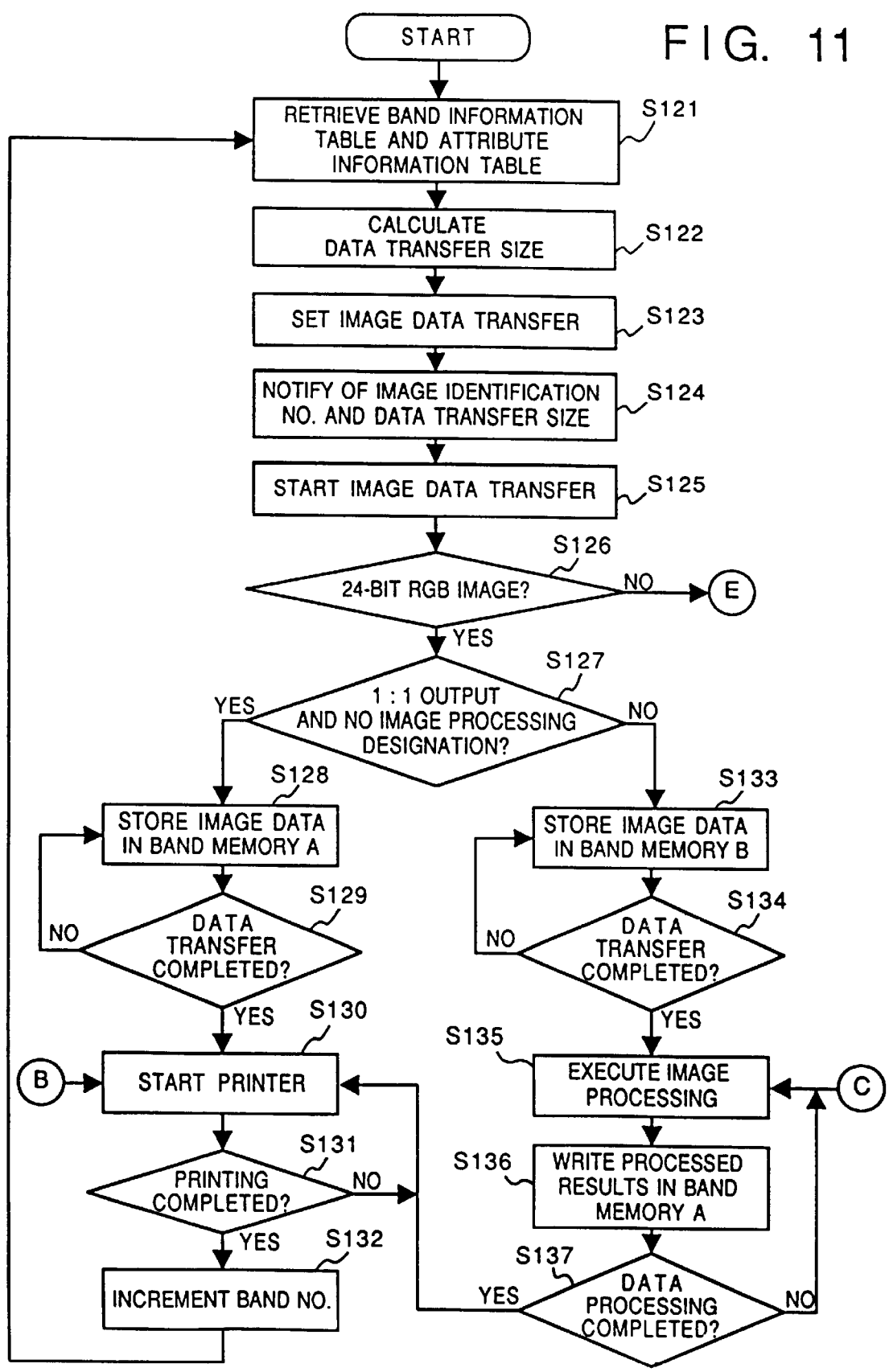
FIGS. 11 and 12 are flowcharts of a control procedure executed by a frame memory controller.
Figure 12:
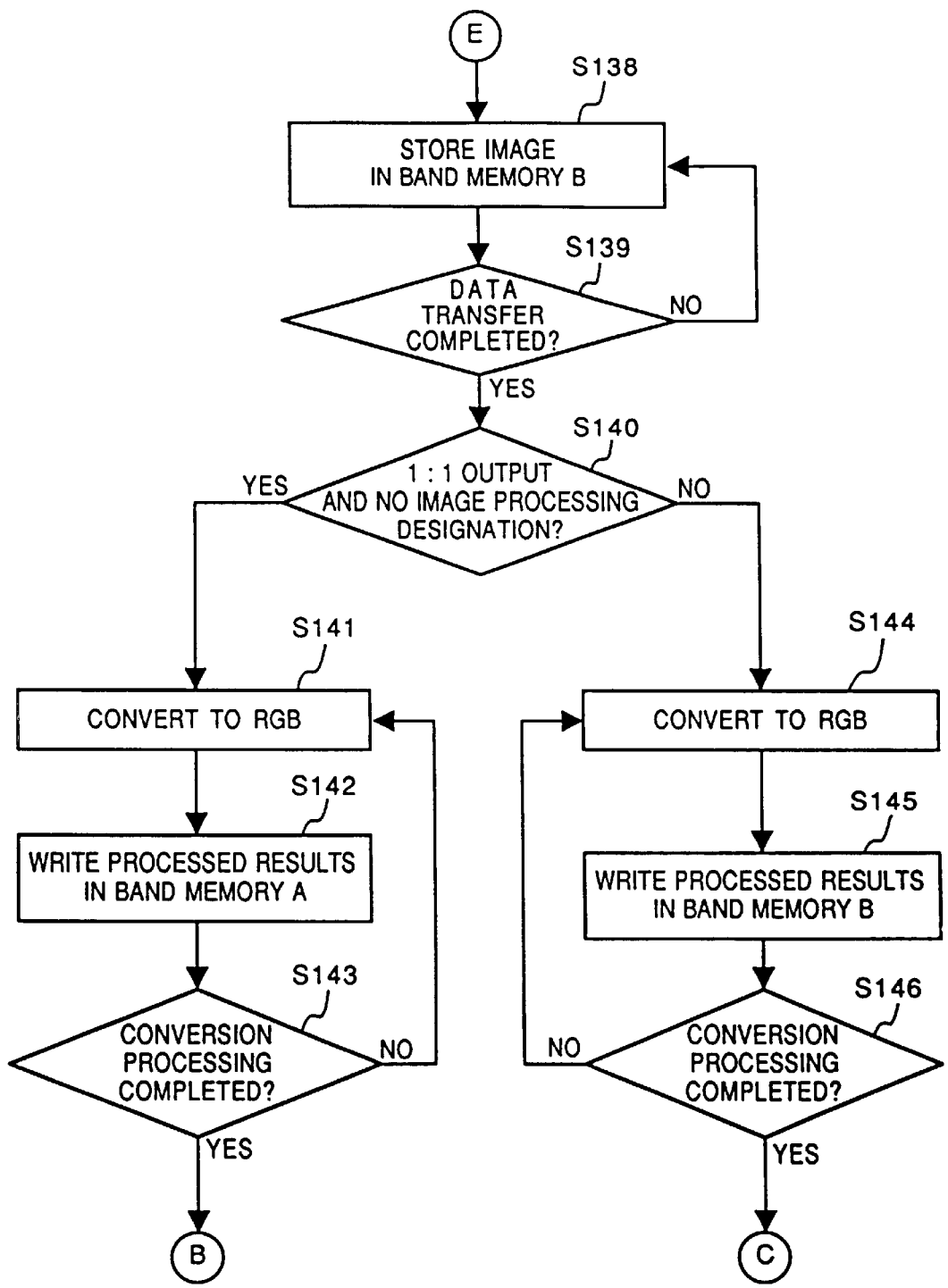

At the completion of feed of the recording paper to the band position at which the (A) pattern is outputted, the frame memory control unit 4 responds to the command GET IMAGE INFORMATION by starting notification of the image identification number and data transfer size. In the case of the (A) pattern, the band-memory control procedure differs depending upon image category and type of image processing. FIGS. 11 and 12 are flowcharts illustrating this control procedures, which is executed by the frame memory control unit 4.

According to the flowchart of FIGS. 11 and 12, the band information table and attribute information table are searched to obtain the enlargement/reduction ratio and image category of the output image in the relevant band (step 121). Data transfer size is calculated based upon this information (step S122).

Next, various settings from image data transfer are made (step S123). At the moment these settings are completed, the external device is notified, in response to the command GET IMAGE INFORMATION from the external device, of the image identification number of the output image obtained from the band information table and the data transfer size previously calculated (step S124). In response to being notified, the external device is triggered into starting the transfer of image data (step S125). Since the band memory which stores the image data differs depending upon the image category and image processing, it is determined at step S126 whether the image category is 24-bit RGB. The program proceeds to step S127 if the answer is YES and to step 138 if the answer is NO.

In case of the 24-bit RGB image, the setting of the enlargement/reduction ratio field in the attribute information table and the setting of the image processing table pointer are discriminated (step S127). In the case of a "1:1" output radio and "0" (meaning that image processing has not be designated), the image data is stored successively in the band memory A (step S128).

It is then determined (step S129) whether the transfer of image data corresponding to the data transfer size communicated earlier has been completed. If the transfer has been completed, the printer 3 is issued a start-up request (step S130) and the image data that has been stored in the band memory A is transmitted to the printer 3. Meanwhile, in response to the command GET IMAGE INFORMATION from the external device, the latter is informed of the fact that the image identification number and data transfer size are both "0".

Next, when notification of completion of printing of one band is received from the printer 3 (step S131), the band number is incremented (step S132), the program returns to step S121, the information table of the next band is retrieved and the above-described control is repeated, thereby realizing the image output of the (A) pattern.

If it is found at step S127 that the enlargement/reduction ratio field is a setting older than "1:1", or if the setting of the image processing table pointer is other than "0" (i.e., if image processing has been designated), than the image data is stored successively in the band memory B (step S133).

It is then determined (step S134) whether the transfer of image data corresponding to the data transfer size communicated has been completed. If the transfer has been completed, than the image data stored in the band memory B is read out successively by the CPU 303, an enlargement/reduction operation is performed (step S135) based upon the enlargement/reduction ratio set in the attribute information table and the result of processing is written in the band memory A (step S136). If the image processing table has a rotation processing or mirror-image processing indication, the write address of the band memory A confirming to the processing of the indication is calculated, after which the result of the enlargement/reduction processing is written at this address.

When the foregoing processing is completed (step S137), the program proceeds to the aforesaid step S130. Meanwhile, in response to the command GET IMAGE INFORMATION from the external device, the latter is informed of the fact that the image identification number and data transfer size are both "0".

If it is found at step S126 that the image category is other than 24-bit RGB (e.g., a palette or bitmap image), then the image data is stored successively in the band memory B (step S138).

It is then determined (step S139) whether the transfer of image data corresponding to the data transfer size communication earlier has been completed. If the transfer has been completed, the attribute information table is searched and the setting of the enlargement/reduction ratio field in the attribute information table and the setting of the image processing table pointer are discriminated (step S140). In the case of a "1:1" output ratio and "0" for the image processing table pointer, the image data stored in the band memory B is read out successively by the CPU 303 and a conversion is made from a bitmap image to a 24-bit RGB image or from a palette image to 24-bit RGB image (step S141). The result is written in the band memory A (step S142). When this conversion processing is completed (step S143), the program proceeds to the aforesaid step S130.

In case of a setting other than "1:1", or if the pointer is other than "0", the image data stored in the band memory B is read out successively by the CPU 303 and a conversion is made from bitmap image to a 24-bit RGB image or from a palette image to 24-bit RGB image (step S144). The result is written in the band memory B again (step S145). When this conversion processing is completed (step S146), the program proceeds to the aforesaid step S135.

In a case where an output image does not exist up to the output area of the (B) pattern after the output of the (A) pattern, the frame memory control unit 4 so informs the printer 3 so that the recording paper will be fed by an amount equivalent to the width of this band. Meanwhile, in response to the command GET IMAGE INFORMATION from the external device, the frame memory control unit 4 gives notification of "0" for both the image identification number and data transfer size.

Figure 13:
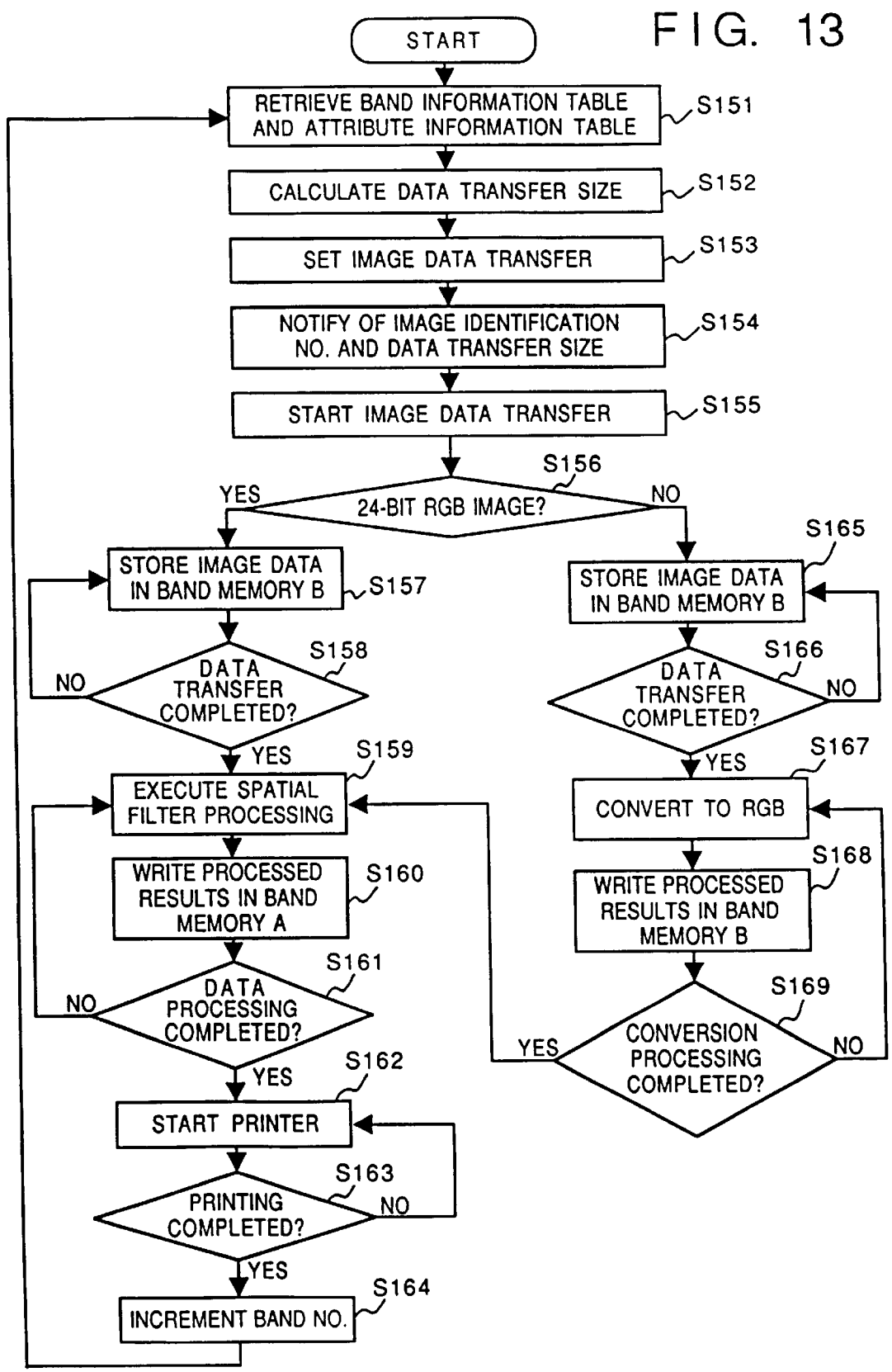
FIG. 13 is a flowchart illustrating a control procedure executed by the frame memory controller.

When the recording paper is fed up to the position of the output band of the (B) pattern, the frame memory control unit 4 responds to the command GET IMAGE INFORMATION by starting notification of the image identification number and data transfer size. In the case of the (B) pattern also, the control procedure of the band memory differs depending upon the image category. FIG. 13 is a flowchart illustrating this control procedure, which is executed by the frame memory control unit 4.

According to the flowchart of FIG. 13, the band information table and attribute information table are searched to obtain the enlargement/reduction ratio and image category of the output image in the relevant band (step S151). Data transfer size is calculated based upon this information (Step S152).

Next, various settings for image data transfer are made (step S153). At the moment these settings are completed, the external device is notified, in response to the command GET IMAGE INFORMATION from the external device, of the image identification number of the output image obtained from the band information table and the data transfer size previously calculated (step S154). In response to being notified, the external device is triggered into starting the transfer of image data (step S155).

It is determined at step S156 whether the image category is 24-bit RGB. The program proceeds to step S157 if the answer is YES and to step 165 if the answer is NO.

In case of the 24-bit RGB image, the image data transferred from the external device is stored successively in the band memory B (step S157). If the transfer of image data corresponding to the data transfer size communicated earlier has been completed (step S158), reference is made to the parameters (spatial filter matrix, information indicating the position of the center pixel, factors, etc.) in the image processing table and a filter operation is applied to the image data, which has been stored in the band memory B, based upon these parameters (step S159). The processed results are written at the address of the band memory A calculated based upon the output area (step S160).

It is then determined (step S161) whether execution of this processing for all data stored in the band memory B has been completed. If the processing of all data has been completed, the printer 3 is issued a start-up request (step S162) and the image data that has been stored in the band memory A is transmitted to the printer 3. Meanwhile, in response to the command GET IMAGE INFORMATION from the external device, the latter is informed of the fact that the image identification number and data transfer size are both "0".

Next, when notification of completion of printing of one band is received from the printer 3 (step S163), the band number is incremented (step S164), the program returns to step S151, the information table of the next band is retrieved and the above-described control is repeated, thereby realizing the image output of the (B) pattern.

If it is found at step S156 that the image category is other than 24-bit RGB (e.g., a palette or bitmap image), then the image data transferred from the external device is stored successively in the band memory B (step S165). It is then determined (step S166) whether the transfer of image data corresponding to the data transfer size communicated earlier has been completed. If the transfer has been completed, then the image data stored in the band memory B is read out successively by the CPU 303 and a conversion is made from a bitmap image to a 24-bit RGB image or from a palette image to 24-bit RGB image (step S167). The result is written in the band memory B (step S168). When this conversion processing is completed (step S169), the program proceeds to the aforesaid step S159.

In the case where an output image does not exist up to the output area of the (C) pattern after the output of the (B) pattern, the frame memory control unit 4 so informs the printer 3 so that the recording paper will be fed by an amount equivalent to the width of this band. Meanwhile, in response to the command GET IMAGE INFORMATION from the external device, the frame memory control unit 4 gives notification of "0" for both the image identification number and data transfer size. Transfer of image data is not executed.

When the recording paper is fed up to the position of the output band of the (C) pattern, the frame memory control unit 4 responds to the command GET IMAGE INFORMATION by starting notification of the image identification number and data transfer size.

Figure 14:
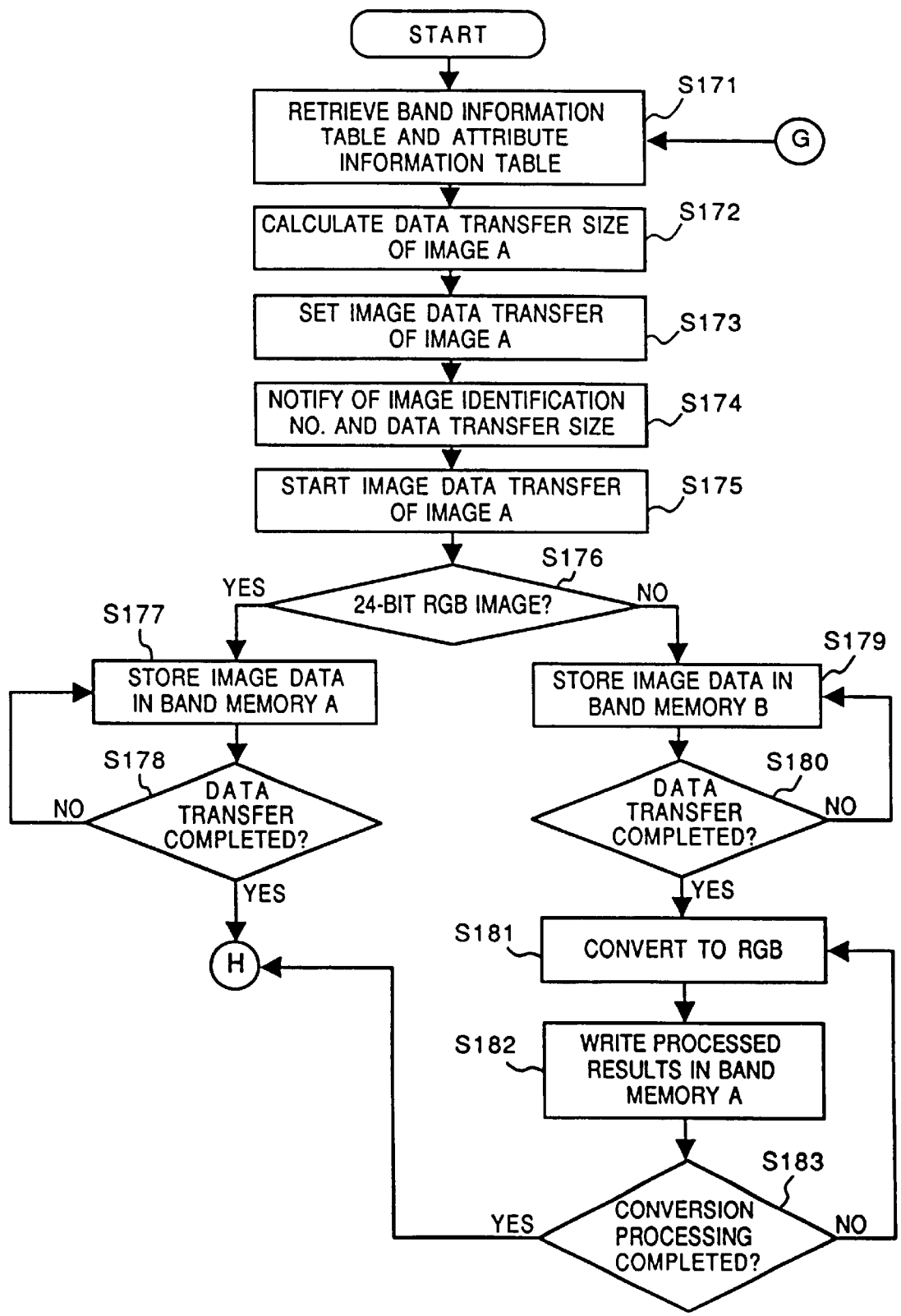
FIGS. 14 and 15 are flowcharts of a control procedure executed by a frame memory controller in a case where an operation is performed between pixels.
Figure 15:
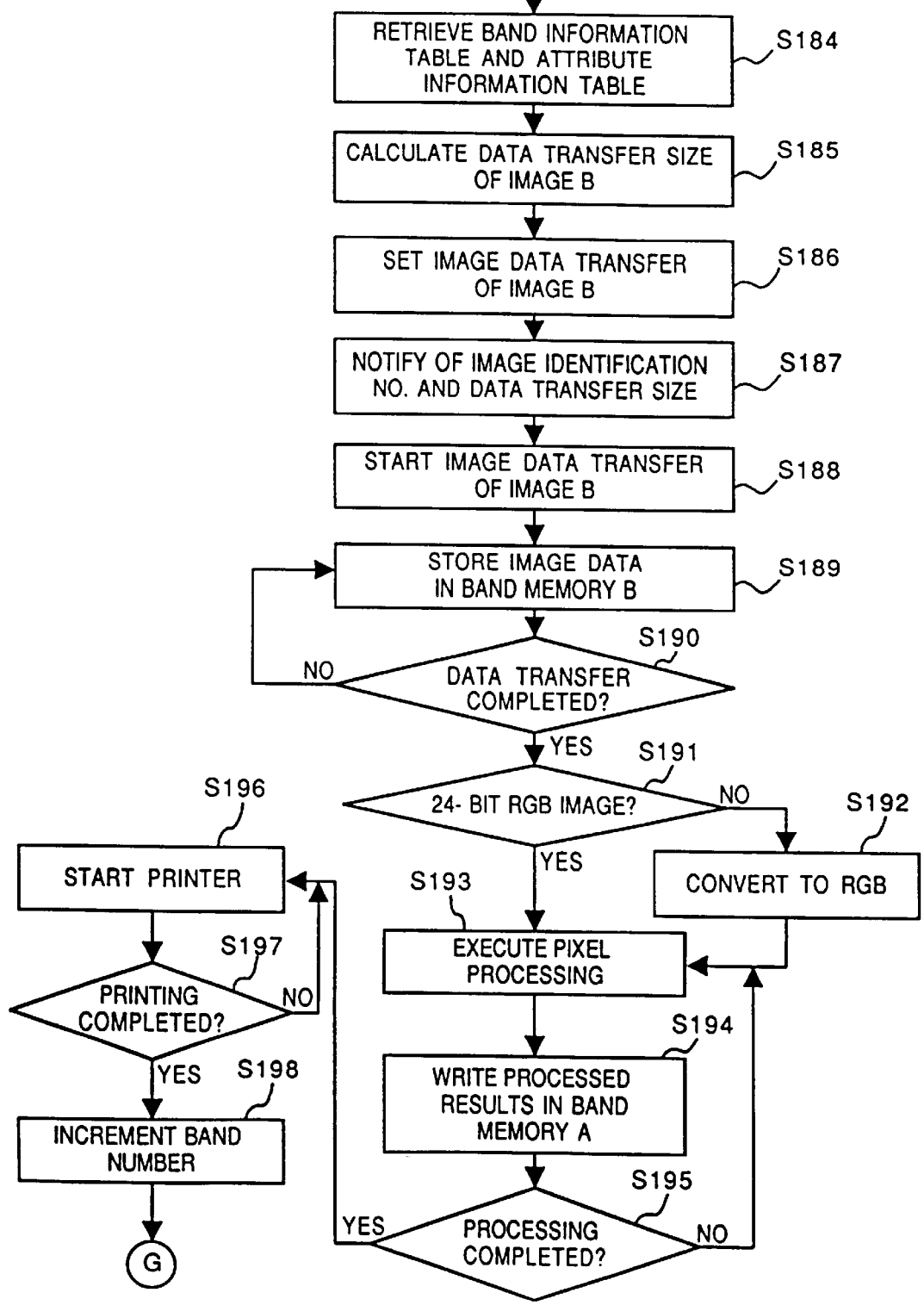

FIGS. 14 and 15 are flowcharts illustrating a control procedure, which is executed by the frame memory control unit 4, in a case where an operation is performed between pixels. In such case the image A, namely the image for which the output area has been designated, is transferred from the host device first.

According to the flowchart of FIGS. 14 and 15, the band information table and attribute information table are searched (step S171) and the data transfer size of the image A is calculated based upon this information (step S172).

Next, various settings for data transfer of the image A are made (step S173). When these settings are completed, the external device is notified, in response to the command GET IMAGE INFORMATION from the external device, of the image identification number of the output image obtained from the band information table and the data transfer size calculated in preprocessing (step S174). In response to being notified, the external device is triggered into starting the transfer of the data of image A (step S175).

It is determined at step S176 whether the image category is 24-bit RGB. The program proceeds to step S177 if the answer is YES and to step 179 if the answer is NO.

In case of the 24-bit RGB image, the data of image A transferred from the external device is stored successively in the band memory A (step S177). It is then determined (step S178) whether the transfer of data of image A corresponding to the data transfer size communicated earlier has been completed. If the transfer has been completed, the program proceeds to step S184.

If it is found at step S176 that the image category is other than 24-bit RGB (e.g., a palette or bitmap image), then the image data transferred from the external device is stored successively in the band memory B (step S179). If the transfer of image data corresponding to the data transfer size communicated earlier has been completed (step S180), the image data stored in the band memory B is read out successively by the CPU 303 and a conversion is made from a bitmap image to a 24-bit RGB image or from a palette image to 24-bit RGB image (step S181). The result is written in the band memory A (step S182). When this conversion processing is completed (step S183), the program proceeds to the aforesaid step S184.

When the processing from step S171 to step S178 (or step S184) is completed, the frame memory control unit 4 starts data transfer processing for the image B.

First, the band information table and attribute information table are searched (step S184) and the data transfer size of the image B is calculated based upon the area size and image category designated in advance by the external device (step S185).

Next, various settings for data transfer of the image B are made (step S186). When these settings are completed, the external device is notified, in response to the command GET IMAGE INFORMATION from the external device, of the image identification number of the output image obtained from the band information table and the data transfer size calculated by preprocessing (step S187). In response to being notified, the external device is triggered into starting the transfer of the data of image B (step S188). The received data of image B is stored successively in the band memory B (step S189).

If transfer of data corresponding to the data transfer size communicated earlier is completed (step S190), the image category of the image B stored in the band memory B is discriminated (step S191) and a conversion is made to a 24-bit RGB image is the category is palette or bitmap (step S192).

The image processing table is then retrieved, the designated area is converted into an address based upon the pixel operation, image-processing designation area and parameters designated by the external device, then the image data stored in the band memories A and B is read out and processing is executed in accordance with the arithmetic expressions cited above (step S193). The operational results are written in the band memory A operational results are written in the band memory A again (step S194). When the pixel operation of the designated area is completed (step S195), a start-up request is sent to the printer 3 (step S196) and the image data stored in the band memory A is transmitted. Meanwhile, in response to the command GET IMAGE INFORMATION from the external device, the frame memory control unit 4 gives notification of "0" for both the image identification number and data transfer size.

When notification of the fact that one band of printing has been completed is accepted from the printer 3 (step S197), the band number is incremented (step S198) and the program returns to step S171.

By subsequently repeating the above-described control procedure, image output of the (C) pattern is realized.

In a case where an output image does not exist up to the output area of the (D) pattern after the output of the (C) pattern, the frame memory control unit 4 so informs the printer 3 so that the recording paper will be fed by an amount equivalent to the width of this band. Meanwhile, in response to the command GET IMAGE INFORMATION from the external device, the frame memory control unit 4 gives notification of "0" for both the image identification number and data transfer size. Transfer of image data is not executed.

When the recording paper is fed up to the position of the output band of the (D) pattern, the frame memory control unit 4 responds to the command GET IMAGE INFORMATION by notifying of the image identification number and data transfer size and receives the image data in the order of the image identification numbers registered in the band information table.

Figure 16:
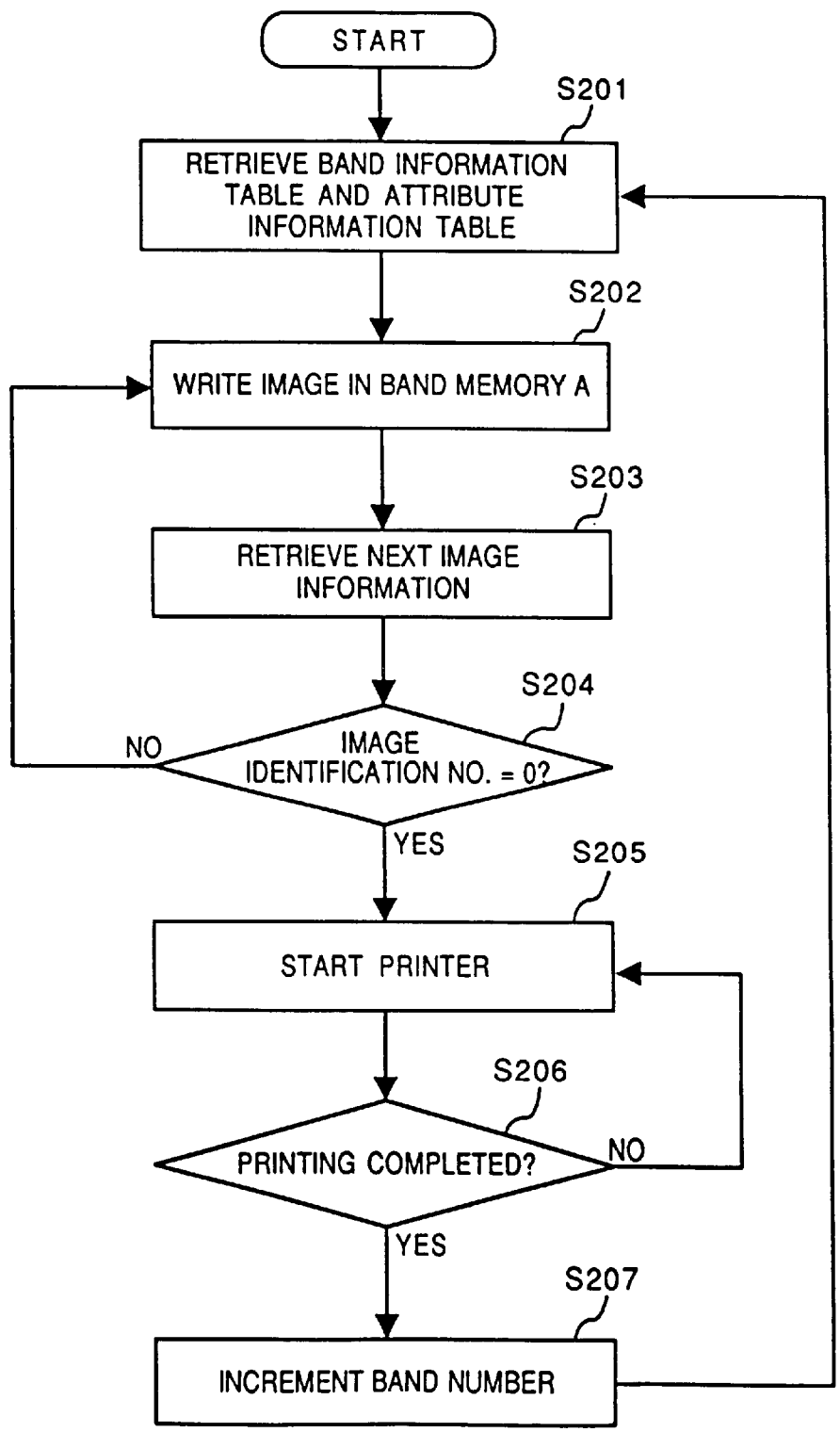
FIG. 16 is a flowchart illustrating a control procedure executed by the frame memory controller.

FIG. 16 is a flowchart illustrating a control procedure executed by the frame memory control unit 4. The control flows according to image category and type of image processing are the same as in the case of the (A) pattern output described above and need not be described in detail again.

According to the flowchart of FIG. 16, image data is written successively in the band memory A (step S202) in accordance with the layout information obtained by retrieving the band information table and attribute information table (step S201), and an image equivalent to the output image is formed in the band memory A.

When data transfer of one image is finished, the next item of image information is retrieved from the band information table and attribute information table (step S203) and it is determined (step S204) whether the entirety of one band of the image registered in the tables has been written in the band memory A. If writing has been concluded, the program proceeds to step S205; otherwise, the program returns to step S202. If the image identification number of the band information table is "0", it is judged that writing has ended.

A start-up request is then sent to the printer 3 (step S205) and the image data stored in the band memory A is transmitted to the printer 3. Meanwhile, in response to the command GET IMAGE INFORMATION from the external device, notification is given of the fact that both the image identification number and data transfer size are both "0".

When notification of the fact that one band of printing has been completed is accepted from the printer 3 (step S206), the band number is incremented (step S207) and the program then returns to step S201. Output of the (D) pattern is realized by repeating the above-described control procedure.

An image designated by the external device is formed on the recording paper by the series of process steps in the flow described above. The content of the table possessed by the frame memory control unit 4 is held until an initializing command is received from the host device. Accordingly, in a case where a plurality of images are outputted, it is unnecessary for the external device to notify the frame memory control unit 4 of control information from the second image onward.

<<Modification of First Embodiment>>

In the foregoing embodiment, an example is described in which the band memory A is used as a buffer for image processing and for outputting an image to the printer 3, while the band memory B is used as a buffer for receiving image data. However, if an arrangement is adopted in which both memories (band memories A and B) are capable of being utilized as both buffers (for reception of image data and for image output), it is possible to speed up such image processing as a pixel operation and spatial filtering applied to an image for which spacing filtering or layout processing has been completed.

In the embodiment described above, a memory space of 16 megabytes is logically partitioned into two sections, namely the band memories A and B. However, if a bus arrangement is adopted in which the band memories A, B are accessed from the CPU 303 independently, it is possible to receive image data from the external device while the image is being outputted from the band memory A to the printer 3. This makes it possible to realize an even higher processing speed.

Further, the band memories A and B obtained by logically partitioning the 16-megabyte memory space into two parts both have a fixed memory capacity of eight megabytes. However, the memory capacity can be made variable for each band in dependence upon the image size, and it is possible to partition the memory space into more than two band-memory portions. In such case one band memory would be used as the buffer for image output to the printer 3, and the remaining plurality of band memories would be used as buffers for receiving image data or as work memories for image processing, thus making it possible to speed up pixel operations between two images and processing for converting bitmap and palette images to 24-bit RGB images.

In the embodiment set forth above, a control procedure for transferring and forming images in band units is described. However, as shown by way of example in FIGS. 17 and 18, it is possible to adopt two forms of memory control in conformity with the memory capacity of the installed frame memory or in conformity with the type of output device connected.

Figure 17:
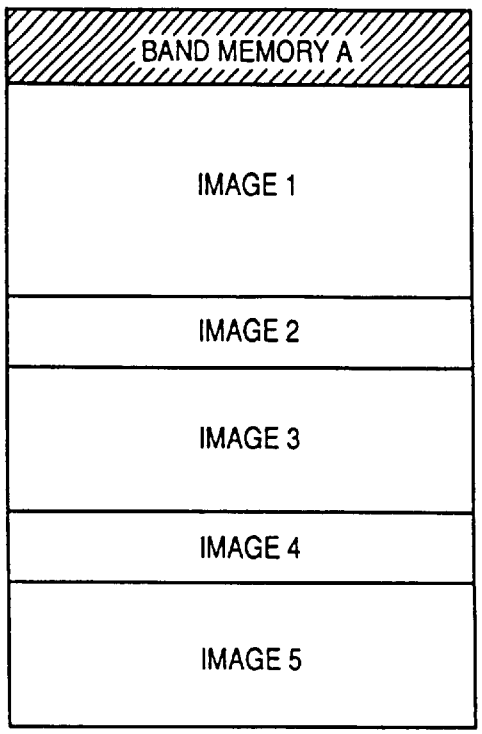
FIG. 17 is a diagram showing another form of controlling a frame memory.

FIG. 17 is an example in which a memory capacity corresponding to an image size of one band is provided for image formation, as described in the foregoing embodiment, with the remaining space being used for registration of image data.

After the external device communicates the layout information and image processing information, it transfers the image data. All of the image data transferred is registered in the memory for image-data registration, a print command is issued as a trigger and, as described in the foregoing embodiment, image data is read from the memory area, in which the relevant image has been registered, based upon the processing table, and an output image is formed in band units. In this case, control of image-data transfer with respect to the external device does not intervene during the printing operation, and an image once registered is retained as long as there is no instruction from the external device. Consequently, even if the same image is outputted as a plurality of images, it is unnecessary to transfer the control information and image data again. This makes it possible to achieve image output control of a higher speed.

Figure 18:
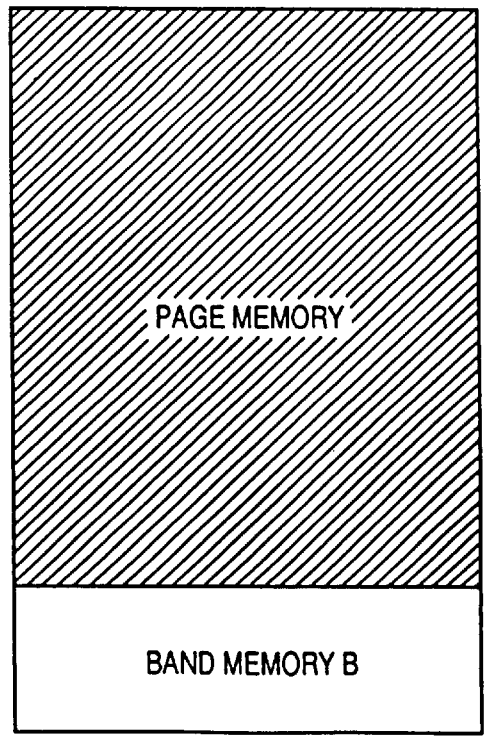
FIG. 18 is a diagram showing a second example of another form of controlling a frame memory.
Figure 19:
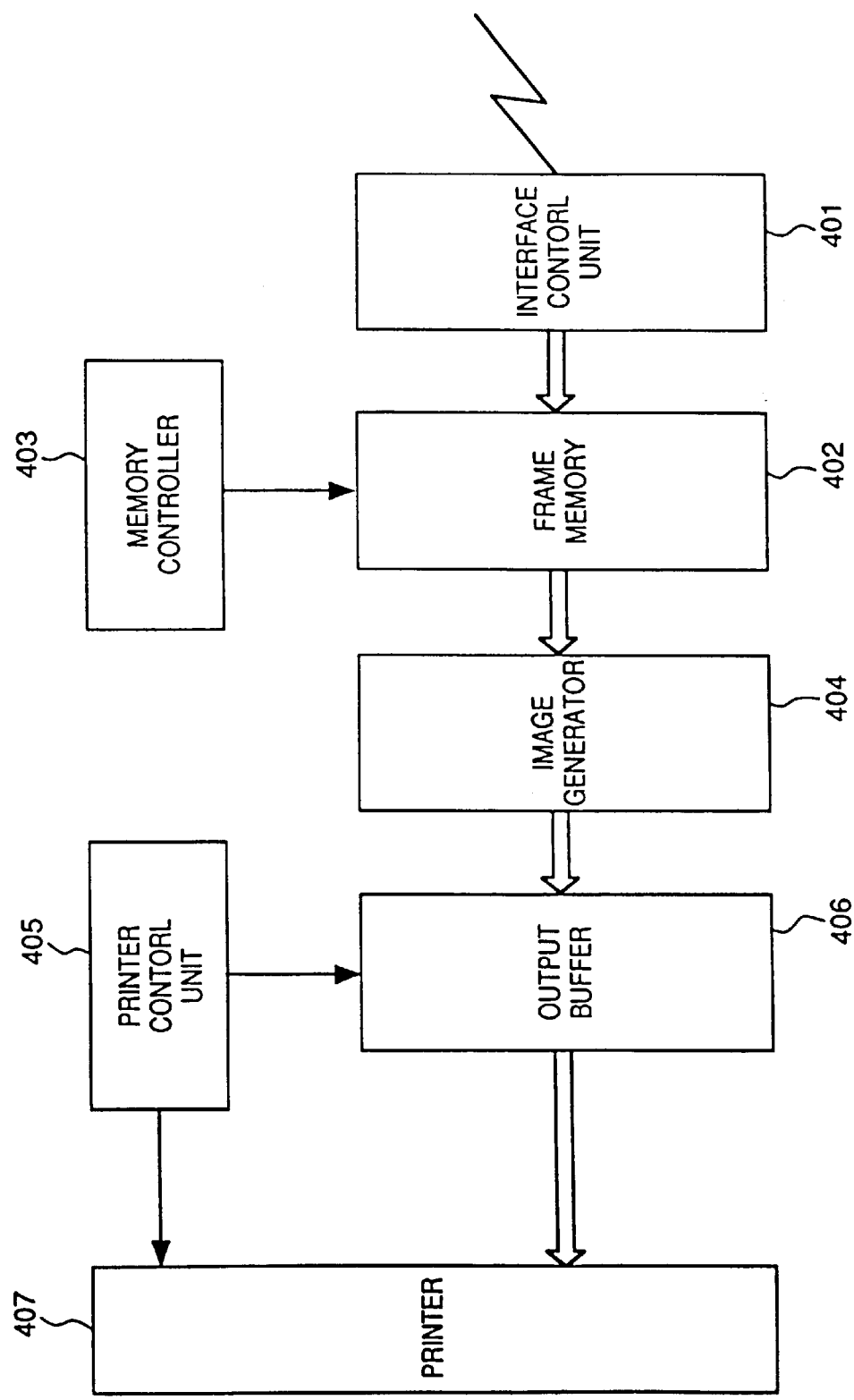
FIG. 19 is a block diagram showing the construction of an image forming apparatus.
Figure 20:
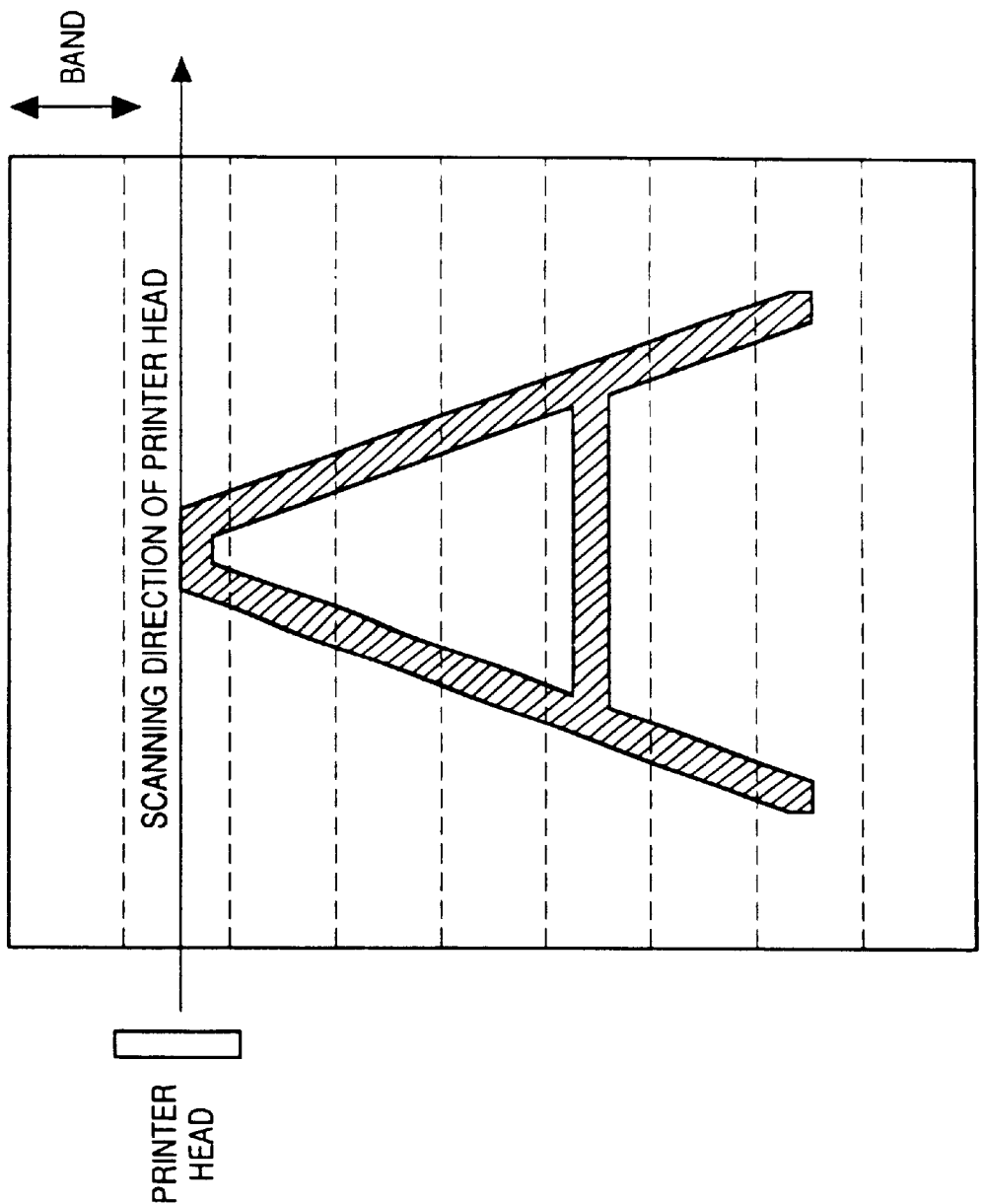
FIG. 20 is a diagram showing a printing operation performed by a printing unit shown in FIG. 19.

FIG. 18 shows an example in which a memory capacity corresponding to one page of recording paper is provided and the remaining memory space is used as a buffer for communicating image data.

As in the control flow described in the foregoing embodiment, the external device communicates the layout information and image processing information, the issues the print command and subsequently transfers the image data in accordance with notification from the frame memory control unit 4. The latter writes the results obtained by executing the relevant processing in the page memory and then issues a start-up command to the printer 3 when one page of an output image is completed. The image formed in the page memory is retained as long as there is no instruction from the external device. Consequently, even if the same image is outputted as a plurality of images, it is unnecessary to transfer the control information and image data again. This makes it possible to achieve image output control of a higher speed.

In the example illustrated in FIG. 18, output to the printer 3 is started upon completion of one page of the output image. This means that the printer serving as the image forming apparatus is not limited to that of the type which forms image in band units, as in the foregoing embodiment. The present invention can be applied also to image output apparatus such as printers and copiers of the type which form images in page units, examples being electrophotographic-type and thermal-type printers and copiers.

In the foregoing embodiment, an example is described in which various image processing operations are executed by the CPU 303. However, an arrangement having a processor, such as a DSP (digital signal processor), exclusively for image processing operations can be adopted, and the DSP can be made to execute the various processing operations.

Further, in the foregoing embodiment, an example is described in which image data formed in the band memory A is outputted to a printer. However, the destination of outputs can be an external storage unit such as a hark disk, a magneto-optical disk, etc. If such an external storage unit is adopted, commands and image data need only be transferred from the external storage unit without being transferred repeatedly from the external device in cases where the same processed image is outputted to the printer 3 a plurality of times. This makes it possible to achieve image output control of a higher speed.

In the foregoing embodiment, an example is described in which image data formed in the band memory A is outputted to a printer. However, the destination of outputs can be a monitor such as a CRT. In such case, processed results in accordance with the layout and image processing information communicated from the external device can be delivered to the output device such as a printer upon verifying the results on the monitor. This makes it possible to obtain printed results more faithful to the user's intentions, thus making it possible to reduce unnecessary consumption of recording media such as recording paper.

Figure 21:
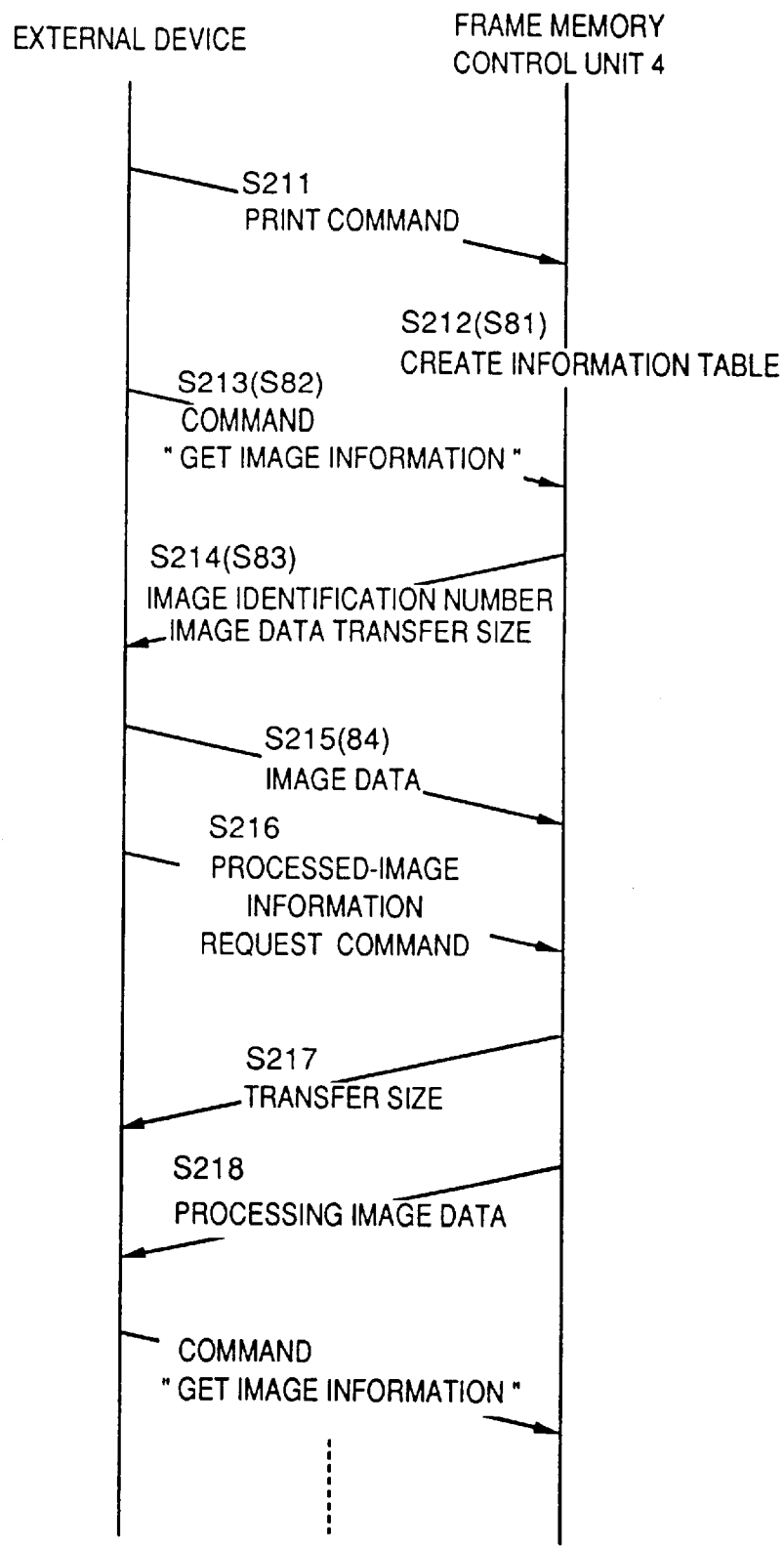
FIG. 21 is a diagram showing an overview of an image output process following issuance of a print command.

Furthermore, the destination of outputs of image data formed in the band memory A can be made the external device. In other words, an arrangement can be adopted in which processed results in accordance with the layout and image processing information communicated from the external device are transferred to this external device or to another external device. FIG. 21 is a diagram showing the general features of an image transfer process performed after issuance of a print command in this case.

As shown in FIG. 21, the external device issues a print command (step S211) containing an instruction for sending processed results back to the external device. The external device then executes a sequence up to step S215 that is identical with the sequence of steps S81 to S84 shown in FIG. 7, after which the external device issues a processed-image information request command (step S216) confirming the size of the processed image. Upon receiving this command, the frame memory control unit 4 notifies the external device of the transfer size of the processed image data (step S217). Upon being so notified, the external device is triggered into starting transfer (reception) of the processing image data (step S218). By subsequently repeating the steps S213 to S218, all processed results from the frame memory control unit 4 are transferred to the external device.

Thus, even if an external device does not possess an image processing function, it is possible for this external device to acquire the results of image processing desired. For example, a processed image can be outputted to a monitor or the like connected to the external device, or the processed image data can be stored in an external storage unit connected to the external device.

In accordance with the embodiment as described above, sophisticated image processing such as pixel operations based upon plural items of image data, synthesis and layout processing becomes possible even if the installed memory is small in capacity and the external device connected for communication has a low processing capability.

Furthermore, even if there are a plurality of formats, such as multivalued formats in RGB and CYMK, palette and bitmap formats, etc., the desired image processing can be executed after the conversion to the prescribed format has been made.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for processing image data in a prescribed unit, comprising:

a first receiving step of receiving, from an external device that is operated in accordance with software, control information which relates to at least one image, and a command which indicates that processed image data should be returned to the external device;

a requesting step of requesting the external device to send image data to the prescribed unit;

a second receiving step of receiving the requested image data from the external device;

a processing step of processing, using a hardware processor, the image data received in said second receiving step in pixel units based upon the control information; and a returning step of returning the processed image data to the external device from which the image data was received in said second receiving step in accordance with the command received in said first receiving step.

2. The method according to claim 1, wherein said control information contains layout information of an image as well as image processing information.

3. An image processing apparatus for processing image data in a prescribed unit, comprising:

a communicator, arranged to communicate with at least one external device operated in accordance with software, wherein said communicator receives, from an external device control information which relates to at least one image, and a command which indicates that processed image data should be returned to said external device, subsequently requests the external device to send image data to the prescribed unit, and receives the requested image data from the external device;

a hardware data processor, arranged to process the image data, which has been received by said communicator, in pixel units based upon the control information; and a transmitter, arranged to transmit, using said communicator, the processed image data to the external device from which the image data was received by said communicator in accordance with the command.

4. The apparatus according to claim 3, wherein said control information contains layout information of an image as well as image processing information.

5. The apparatus according to claim 3, further comprising an image former, arranged to form an image based upon image-processed image data stored in a memory, wherein said communicator again requests the external device to send image data to the prescribed unit in conformity with formation of the image by said image former.

6. The apparatus according to claim 5, wherein the prescribed unit is the width of an image capable of being formed at one time by said image former.

7. The apparatus according to claim 3, wherein said communicator transmits image-processed image data, which has been stored in the memory, to the external device and, when transmission is finished, again requests the external device for image data in the prescribed unit.

* * * * *

UNITED STATES PATENT AND TRADEMARK OFFICE
CERTIFICATE OF CORRECTION

PATENT NO.  : 6,292,202 B1
DATED       : September 18, 2001
INVENTOR(S) : Masahiro Nishio It is certified that error appears in the above-identified patent and that said Letters Patent is hereby corrected as shown below:

Column 5,
Line 43, "have" should read -- has --.
Line 54, "portion." should read -- portions. --.

Column 14,
Line 23, "operational results are" should be deleted.
Line 23, "written in the band memory A" should be deleted.

Column 16,
Line 28, "the" should read -- then --.

Signed and Sealed this

Twenty-second Day of July, 2003

JAMES E. ROGAN
*Director of the United States Patent and Trademark Office*